US012197426B2

(12) United States Patent
Bawadhankar et al.

(10) Patent No.: US 12,197,426 B2
(45) Date of Patent: *Jan. 14, 2025

(54) COMPRESSION OF FLUCTUATING DATA

(71) Applicant: Chicago Mercantile Exchange Inc., Chicago, IL (US)

(72) Inventors: Dhiraj Bawadhankar, Naperville, IL (US); Fateen Sharaby, Demarest, NJ (US); Naresha Chari, Chicago, IL (US); Romil Parekh, Northbrook, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,208

(22) Filed: Jan. 9, 2024

(65) Prior Publication Data
US 2024/0160623 A1    May 16, 2024

Related U.S. Application Data

(63) Continuation of application No. 17/962,921, filed on Oct. 10, 2022, now Pat. No. 11,907,207.
(Continued)

(51) Int. Cl.
*G06F 7/00* (2006.01)
*G06F 16/23* (2019.01)

(52) U.S. Cl.
CPC ...... *G06F 16/2379* (2019.01); *G06F 16/2365* (2019.01)

(58) Field of Classification Search
CPC ............ G06F 16/2379; G06F 16/2365; G06F 16/217; G06F 16/23
(Continued)

(56) References Cited

U.S. PATENT DOCUMENTS 5,068,816 A    11/1991    Noetzel
5,274,813 A    12/1993    Itoh
(Continued)

FOREIGN PATENT DOCUMENTS

WO    0150776 A2    7/2001
WO    2006103474 A2    10/2006
WO    2009070690 A1    6/2009

OTHER PUBLICATIONS

"Bloomberg Creates First NDF Clearing Link from FXGO to CME Group", Business Wire, Jul. 10, 2012. (Year: 2012).
(Continued)

*Primary Examiner* — Md I Uddin
(74) *Attorney, Agent, or Firm* — Lempia Summerfield Katz LLC

(57) ABSTRACT

The disclosed embodiments relate to a system/apparatus for reducing a data size of a database/data structure stored in a memory of a data transaction processing system, which stores a plurality of data records, each of the plurality of data records being characterized by a record data size and storing data indicative of a position (of one or more portfolios) in one or more financial instruments, such as interest rate swaps, futures contracts, etc. The system/apparatus may be referred to as an architecture which enables post-trade processing of portfolio/position databases/data structures, or subsets thereof, to reduce the data size thereof for storage, communication and/or processing and may further reduce other aspects or characteristics such as gross notional value, total risk, etc. More particularly, the disclosed embodiments implement a compression module which, as described above, may be a part of the exchange computer system or an adjunct service provided thereto, and which processes a select subset of data records to effect an optimized reduction thereof as described.

20 Claims, 12 Drawing Sheets

Related U.S. Application Data

(60) Provisional application No. 63/254,686, filed on Oct. 12, 2021.

(58) Field of Classification Search
USPC .................. 707/662, 668, 783, 693, E17.002
See application file for complete search history.

(56) References Cited

U.S. PATENT DOCUMENTS

| | | |
|---|---|---|
| 5,644,727 A | 7/1997 | Atkins |
| 5,978,511 A | 11/1999 | Horiuchi et al. |
| 6,064,985 A | 5/2000 | Anderson |
| 6,278,981 B1 | 8/2001 | Dembo et al. |
| 6,282,520 B1 | 8/2001 | Schirripa |
| 6,304,858 B1 | 10/2001 | Mosler et al. |
| 6,317,727 B1 | 11/2001 | May |
| 6,333,788 B1 | 12/2001 | Yamada et al. |
| 6,385,249 B1 | 5/2002 | Kondo et al. |
| 6,424,972 B1 | 7/2002 | Berger et al. |
| 7,181,422 B1 | 2/2007 | Philip et al. |
| 7,222,317 B1 | 5/2007 | Mathur et al. |
| 7,236,952 B1 | 6/2007 | D'Zmura |
| 7,349,878 B1 | 3/2008 | Makivic |
| 7,430,539 B2 | 9/2008 | Glinberg et al. |
| 7,509,275 B2 | 3/2009 | Glinberg et al. |
| 7,565,316 B1 | 7/2009 | Amin et al. |
| 7,580,876 B1 | 8/2009 | Phillips et al. |
| 7,587,641 B1 | 9/2009 | Sloane et al. |
| 7,702,563 B2 | 4/2010 | Balson et al. |
| 7,734,538 B2 | 6/2010 | Bauerschmidt et al. |
| 7,809,631 B2 | 10/2010 | Bauerschmidt et al. |
| 7,822,668 B2 | 10/2010 | Benda |
| 7,870,052 B1 | 1/2011 | Goldberg et al. |
| 8,108,281 B2 | 1/2012 | Koblas et al. |
| 8,165,942 B1 | 4/2012 | Rordorf |
| 8,255,313 B2 | 8/2012 | Kraus et al. |
| 8,301,537 B1 | 10/2012 | Rachev et al. |
| 8,494,953 B1 | 7/2013 | Boberski |
| 8,515,058 B1 | 8/2013 | Gentry |
| 8,725,621 B2 | 5/2014 | Marynowski et al. |
| 8,805,735 B1 | 8/2014 | Goldberg et al. |
| 8,862,560 B1 | 10/2014 | Wu et al. |
| 8,965,804 B2 | 2/2015 | Connors |
| 9,396,131 B1 | 7/2016 | Hendry et al. |
| 10,140,659 B2 | 11/2018 | Xythalis |
| 10,203,879 B2 | 2/2019 | Yamato et al. |
| 10,319,032 B2 | 6/2019 | Zhan et al. |
| 10,326,862 B2 | 6/2019 | Bonig |
| 10,475,123 B2 | 11/2019 | Bawadhankar |
| 10,572,939 B1 | 2/2020 | Bawadhankar et al. |
| 10,609,172 B1 * | 3/2020 | Sharaby .............. H03M 7/3057 |
| 10,650,457 B2 | 5/2020 | Bawadhankar et al. |
| 10,748,212 B2 | 8/2020 | Xythalis et al. |
| 10,789,588 B2 | 9/2020 | Burnham et al. |
| 10,884,988 B2 | 1/2021 | Chuprun et al. |
| 10,896,467 B2 | 1/2021 | Bawadhankar et al. |
| 10,992,766 B2 | 4/2021 | Sharaby et al. |
| 11,004,148 B2 | 5/2021 | Zhan et al. |
| 11,791,914 B2 * | 10/2023 | Cella .................. G05B 23/0286 702/188 |
| 2002/0002528 A1 | 1/2002 | Terada et al. |
| 2002/0038272 A1 | 3/2002 | Menchero |
| 2002/0138386 A1 | 9/2002 | Maggioncalda et al. |
| 2003/0028466 A1 | 2/2003 | Jenson et al. |
| 2003/0036918 A1 | 2/2003 | Pintsov |
| 2003/0055777 A1 | 3/2003 | Ginsberg |
| 2003/0061577 A1 | 3/2003 | Saluja et al. |
| 2003/0101026 A1 | 5/2003 | Rabinowitz et al. |
| 2003/0204462 A1 | 10/2003 | Eisler |
| 2003/0236738 A1 | 12/2003 | Lange et al. |
| 2004/0177023 A1 | 9/2004 | Krowas et al. |
| 2004/0186804 A1 | 9/2004 | Chakraborty et al. |
| 2004/0199448 A1 | 10/2004 | Chalermkraivuth et al. |
| 2004/0205457 A1 | 10/2004 | Bent et al. |
| 2004/0220870 A1 | 11/2004 | Lundberg et al. |
| 2005/0050372 A1 | 3/2005 | Hagiwara |
| 2005/0055301 A1 | 3/2005 | Cohen et al. |
| 2005/0096950 A1 | 5/2005 | Caplan et al. |
| 2005/0097029 A1 | 5/2005 | Cooper |
| 2005/0192898 A1 | 9/2005 | Hache |
| 2006/0059067 A1 | 3/2006 | Glinberg et al. |
| 2006/0112049 A1 | 5/2006 | Mehrotra et al. |
| 2006/0224494 A1 | 10/2006 | Pinkava |
| 2006/0259378 A1 | 11/2006 | Fornasari |
| 2007/0033123 A1 | 2/2007 | Navin |
| 2007/0083458 A1 | 4/2007 | Rosenthal et al. |
| 2007/0083586 A1 | 4/2007 | Luo et al. |
| 2007/0118459 A1 | 5/2007 | Bauerschmidt et al. |
| 2007/0156555 A1 | 7/2007 | Orr |
| 2007/0186206 A1 | 8/2007 | Abrams et al. |
| 2007/0198387 A1 | 8/2007 | Uenohara et al. |
| 2007/0239589 A1 | 10/2007 | Wilson et al. |
| 2007/0244785 A1 | 10/2007 | Williams |
| 2007/0271204 A1 | 11/2007 | Jiang |
| 2007/0288351 A1 | 12/2007 | Huntley |
| 2008/0120251 A1 | 5/2008 | Tyagi et al. |
| 2008/0183615 A1 | 7/2008 | Rio et al. |
| 2008/0196076 A1 | 8/2008 | Shatz et al. |
| 2008/0235172 A1 | 9/2008 | Rosenstein et al. |
| 2008/0249956 A1 | 10/2008 | Connors |
| 2008/0249958 A1 | 10/2008 | Anguish et al. |
| 2008/0294571 A1 | 11/2008 | Maloney et al. |
| 2008/0319920 A1 | 12/2008 | Levin et al. |
| 2009/0138536 A1 | 5/2009 | Chao et al. |
| 2009/0171826 A1 | 7/2009 | Hadi et al. |
| 2009/0216824 A1 | 8/2009 | Weinberg et al. |
| 2009/0248564 A1 | 10/2009 | Fallon et al. |
| 2009/0265284 A1 | 10/2009 | Rowell |
| 2009/0281956 A1 | 11/2009 | An et al. |
| 2009/0299910 A1 | 12/2009 | Khuong-Huu et al. |
| 2009/0307124 A1 | 12/2009 | Meyerhoff |
| 2009/0327160 A1 | 12/2009 | Perry et al. |
| 2010/0106633 A1 | 4/2010 | Tyer et al. |
| 2010/0138362 A1 | 6/2010 | Whitehurst |
| 2010/0145875 A1 | 6/2010 | Schmid et al. |
| 2010/0185559 A1 | 7/2010 | May |
| 2010/0191628 A1 | 7/2010 | Arnott et al. |
| 2010/0259204 A1 | 10/2010 | Imura |
| 2010/0280970 A1 | 11/2010 | Lai et al. |
| 2010/0281086 A1 | 11/2010 | Ganai et al. |
| 2010/0323350 A1 | 12/2010 | Gordon et al. |
| 2010/0328530 A1 | 12/2010 | Hashimoto et al. |
| 2011/0004568 A1 | 1/2011 | Phillips et al. |
| 2011/0035342 A1 | 2/2011 | Koblas et al. |
| 2011/0060603 A1 | 3/2011 | Capelli et al. |
| 2011/0153521 A1 | 6/2011 | Green et al. |
| 2011/0161244 A1 | 6/2011 | Iyer et al. |
| 2011/0179112 A1 | 7/2011 | Ravichandran et al. |
| 2011/0221489 A1 | 9/2011 | Tarng et al. |
| 2012/0016784 A1 | 1/2012 | Mintz et al. |
| 2012/0254008 A1 | 10/2012 | Brady |
| 2012/0296793 A1 | 11/2012 | Wilson, Jr. et al. |
| 2012/0317011 A1 | 12/2012 | Duquette |
| 2013/0018769 A1 | 1/2013 | Boudreault et al. |
| 2013/0018818 A1 | 1/2013 | Yadav |
| 2013/0036074 A1 | 2/2013 | Kaestel |
| 2013/0041799 A1 | 2/2013 | Nyhoff et al. |
| 2013/0041843 A1 | 2/2013 | Nyhoff et al. |
| 2013/0117197 A1 | 5/2013 | Shah et al. |
| 2013/0241933 A1 | 9/2013 | Thatcher et al. |
| 2013/0275396 A1 * | 10/2013 | Condict .................. H03M 7/30 707/693 |
| 2013/0282547 A1 | 10/2013 | Nyhoff et al. |
| 2013/0282554 A1 | 10/2013 | Boberski |
| 2013/0339272 A1 | 12/2013 | Willism, III |
| 2014/0023167 A1 | 1/2014 | Meyer |
| 2014/0025552 A1 | 1/2014 | Hirani et al. |
| 2014/0032443 A1 | 1/2014 | Ossanna et al. |
| 2014/0067639 A1 | 3/2014 | Macwilliams |
| 2014/0229351 A1 | 8/2014 | Lutnick et al. |
| 2014/0236798 A1 | 8/2014 | Feilbogen et al. |
| 2014/0258072 A1 | 9/2014 | Mayor et al. |
| 2014/0279364 A1 | 9/2014 | Sandhu et al. |
| 2015/0026028 A1 | 1/2015 | Davies et al. |

(56) References Cited

U.S. PATENT DOCUMENTS

| | | |
|---|---|---|
| 2015/0039530 A1 | 2/2015 | Jha et al. |
| 2015/0063374 A1 | 3/2015 | Venkatachalam Jayaraman et al. |
| 2015/0324914 A1 | 11/2015 | Zhan et al. |
| 2015/0365619 A1 | 12/2015 | Mayer et al. |
| 2016/0035024 A1 | 2/2016 | Mn et al. |
| 2016/0179853 A1* | 6/2016 | Bertin .................. G06F 16/113 707/662 |
| 2016/0246266 A1 | 8/2016 | Kniazev et al. |
| 2016/0285571 A1 | 9/2016 | Badiu et al. |
| 2017/0061329 A1 | 3/2017 | Kobayashi et al. |
| 2018/0247191 A1 | 8/2018 | Katz et al. |
| 2020/0356990 A1 | 11/2020 | Burnham et al. |
| 2021/0097620 A1 | 4/2021 | Bawadhankar et al. |
| 2021/0211516 A1 | 7/2021 | Sharaby et al. |
| 2021/0217086 A1 | 7/2021 | Zhan et al. |
| 2022/0391099 A1* | 12/2022 | Cooper ............... H03M 7/4043 |

OTHER PUBLICATIONS

"Impact Netting on Credit, Liquidity and Systemic Risk", ifci, Switzerland, Feb. 1, 2001, pp. 1-7.
"Introducing Amazon API Gateway", Jul. 9, 2015. (Year: 2015).
"Introducing AWS Lambda", Nov. 13, 2014. (Year: 2014).
"MFX: Understanding Cross Currency Swaps", Web archives, Nov. 14, 2008, pp. 1-6.
"TriOptima and LCH.Clearnet Compression of Cleared Interest Rate Swaps Exceeds $100 Trillion in Notational; $20.4 Trillion Compressed in 2012 Alone", ICAP, Feb. 23, 2012, http://www.icap.com/news/2012/trioptima-swap-clear-usd100-trillion.aspx, 2 pages.
Abdelkhalek et al., "Parallelization, Optimization, and Performance Analysis of Portfolio Choice Models", International Conference on Parallel Processing, 2001, pp. 277-286, Valencia, Spain.
Anella Munro et al., "Motivations for Swap-Covered Foreign Currency Borrowing", BIS Papers No. 52, Aug. 2009, pp. 145-185.
Bill Hodgson, Price Alignment Interest, OTC Space, Oct. 5, 2012, 6 pages.
Christopher Whiteley, "G-20 Reforms, Hedging and Cover Bonds", Capital Markets Law Journal, 2012, pp. 151-168, vol. 7, No. 2.
Communication with Extended EP Search Report in EP15174114.7, dated Nov. 4, 2015.
Derivative Processing Under the Dodd-Frank Act and European Market Infrastructure Reform (EMIR), Cleared Swap Handbook, BNY Mellon, Jun. 2013, 15 pages.
EP Search Report in European Patent Application No. 15174114.7, dated Jun. 13, 2018, 7 pages.
Extended EP Search Report in EP15191983, dated Dec. 17, 2015, 6 pages.
Extended European Search Report, from EP Application No. 15189429.2, Mar. 14, 2016, EP.
Fu, Yee-Tien: Derivative Security Markets: Currency and Interest Rate Swaps, 2009, MS & E247s International Investments, Standford.edu, pp. 1-82 (Year: 2009).
Gerald Gay et al., "The Pricing and Valuation of Swaps", E-Book, Financial Derivatives: Pricing and Risk Management, Chapter 28, Oct. 2009, 21 pages.
Gilbert, "Implications of Netting Arrangements for Bank Risk on Foreign Exchange Transactions", Mar. 2, 2003, pp. 1-14.
International Search Report in International Patent Application No. PCT/US2015/029941, dated Aug. 10, 2015, 2 pages.
ISDA, Interest Rate Swaps Compression: A Progress Report, ISDA Study, 9 pages, Feb. 2012.
Labuszewski et al., "Speculative Strategies with Treasury Options", CME Group, Nov. 11, 2013, 36 pages.
Laurent et al., Lauren et al., REv Deriv Res, Aug. 28, 2014, pp. 261-286, vol. 17.
Orcun Kaya, "Reforming OTC Derivatives Markets, Observable Changes and Open Issues", Deutsche Bank, Current Issues, Global Financial Markets, Aug. 7, 2013, 24 pages.
Paul C. Harding, "The ISDA 2013 Standard Credit Support Annex", Derivatives Documentation Limited, Aug. 27, 2013, 5 pages.
Risk Management—Portfolio Compression for Outstanding Interest Rate Swap Trades, https://www.ccilindia.com/RiskManagement/Pages/Portfoliocompression.aspx, 2014, Developed by NSE-IT and maintained by CCIL-IT, 1 page, May 6, 2014.
Stu McClymont, Price Alignment Interest (PAI), The OTC Space, 2015, 4 pages.
Varma, Jayanth R., "Two curves and non deliverable interest rate swaps", Prof. Jayanth R. Varnna's Financial Markets Blog, Jul. 24, 2011(Year: 2011).

* cited by examiner

Fig. 7

Fixed Rate* = Fixed Rate - Spread

| | Fixed Rate | Spread Rate | Fixed Rate* | Spread* |
|---|---|---|---|---|
| Swap 1 | 2.56 | 0.0015 | 2.5585 | 0 |
| Swap 2 | 1.87 | 0.0018 | 1.8682 | 0 |
| Swap 3 | 2.325 | -0.003 | 2.328 | 0 |
| Swap 4 | 2.425 | 0.0022 | 2.4228 | 0 |
| Swap 5 | 2.42 | 0.0025 | 2.4175 | 0 |
| Swap 6 | 1.985 | -0.001 | 1.986 | 0 |
| Swap 7 | 2.03 | 0.0015 | 2.0285 | 0 |
| Swap 8 | 2.65 | 0.0022 | 2.6478 | 0 |
| Swap 9 | 2.12 | 0.006 | 2.114 | 0 |
| Swap 10 | 2.4225 | 0.005 | 2.4175 | 0 |

FIG. 8

$$\text{Net Weighted Notional} = \sum_{i=1}^{n} \text{Fixed Rate}^* \times \text{Notional}_i$$

| | Fixed Rate | Spread | Fixed Rate* | Spread | Notional | Weighted notional |
|---|---|---|---|---|---|---|
| Swap 1 | 2.56 | 0.0015 | 2.5585 | 0 | 165,000,000.00 | 422,152,500.00 |
| Swap 2 | 1.87 | 0.0018 | 1.8682 | 0 | 165,000,000.00 | 308,253,000.00 |
| Swap 3 | 2.325 | -0.003 | 2.328 | 0 | -196,000,000.00 | -456,288,000.00 |
| Swap 4 | 2.425 | 0.0022 | 2.4228 | 0 | 178,000,000.00 | 431,258,400.00 |
| Swap 5 | 2.42 | 0.0025 | 2.4175 | 0 | -165,000,000.00 | -398,887,500.00 |
| Swap 6 | 1.985 | -0.001 | 1.986 | 0 | 165,000,000.00 | 327,690,000.00 |
| Swap 7 | 2.03 | 0.0018 | 2.0285 | 0 | -149,350,000.00 | -302,956,475.00 |
| Swap 8 | 2.65 | 0.0022 | 2.6478 | 0 | -298,700,000.00 | -790,897,860.00 |
| Swap 9 | 2.12 | 0.006 | 2.114 | 0 | 298,700,000.00 | 631,451,800.00 |
| Swap 10 | 2.4225 | 0.005 | 2.4175 | 0 | 169,350,000.00 | 409,403,625.00 |
| | | | Lowest Fixed Rate | Highest Fixed Rate | Net Notional | Net Weighted Notional |
| | | | 1.8682 | 2.6478 | 332,000,000.00 | 581,179,490.00 |

Fig. 9

Original Compression Group

Gross Notional = 1,950,100,000.00

| Swap | Fixed Rate | Spread - Floating Leg | Notional | Weighted Notional |
|---|---|---|---|---|
| Swap 1 | 2.55 | 0.0015 | 165,000,000.00 | 422,152,500.00 |
| Swap 2 | 1.87 | 0.0018 | 165,000,000.00 | 308,253,000.00 |
| Swap 3 | 2.325 | -0.003 | -198,000,000.00 | -458,288,000.00 |
| Swap 4 | 2.65 | 0.0022 | -298,700,000.00 | -790,897,660.00 |
| ... | | | | |
| Swap 10 | 2.4225 | 0.005 | 169,350,000.00 | 409,403,625.00 |
| | | Sum | 332,000,000.00 | 581,179,490.00 |

FIXED CASH FLOWS

| Period → | 91 | 182 | 271 | 364 |
|---|---|---|---|---|
| Swap 1 | $ 2,129,358.90 | $ 2,094,641.10 | $ 2,129,358.90 | $ 2,094,641.10 |
| Swap 2 | $ 1,555,430.14 | $ 1,530,069.86 | $ 1,555,430.14 | $ 1,530,069.86 |
| Swap 3 | $ (2,297,227.40) | $ (2,259,772.60) | $ (2,297,227.40) | $ (2,259,772.60) |
| Swap 4 | $ (3,990,304.66) | $ (3,925,245.34) | $ (3,990,304.66) | $ (3,925,245.34) |
| ... | | | | |
| Swap 10 | $ 2,068,111.48 | $ 2,034,392.27 | $ 2,068,111.48 | $ 2,034,392.27 |
| Total | $ 2,943,414.60 | $ 2,895,424.15 | $ 2,943,414.60 | $ 2,895,424.15 |

FLOAT CASH FLOWS

| Period → | 91 | 182 | 271 | 364 |
|---|---|---|---|---|
| Swap 1 | ($50,572.27) | ($42,424.66) | ($40,258.19) | ($56,498.03) |
| Swap 2 | ($50,621.81) | ($42,670.13) | ($40,507.73) | ($56,743.50) |
| Swap 3 | $55,627.48 | $46,021.61 | $43,375.61 | $62,739.06 |
| Swap 4 | $92,605.18 | $77,839.36 | $73,933.57 | $103,315.42 |
| ... | | | | |
| Swap 10 | ($54,893.53) | ($46,482.40) | ($44,307.59) | ($60,926.79) |
| Total | ($12,880.44) | ($80,304.82) | ($92,126.96) | ($124,622.14) |

| Total Cashflows | $ 2,830,534.46 | $ 2,799,119.33 | $ 2,851,287.64 | $ 2,770,802.00 |

FIG. 10
Blending result

Gross Notional = 432,212,698.82

| Remnant | Fixed Rate | Spread | Notional |
|---|---|---|---|
| Remnant 1 | 2.6479 (High) | 0 | (50,106,349.41) |
| Remnant 2 | 1.2632 (Low) | 0 | 382,106,349.41 |
| | | Gross Notional | 432,212,698.82 |

FIXED CASH FLOWS

| Period → | 91 | 182 | 271 | 364 |
|---|---|---|---|---|
| Remnant 1 | $ (688,610.22) | $ (657,905.70) | $ (666,610.22) | $ (657,905.70) |
| Remnant 2 | $ 3,598,591.76 | $ 3,539,919.06 | $ 3,596,591.76 | $ 3,539,919.06 |
| Total | $ 2,829,781.54 | $ 2,882,013.36 | $ 2,929,781.54 | $ 2,882,013.36 |

FLOAT CASH FLOWS

| Period → | 91 | 182 | 271 | 364 |
|---|---|---|---|---|
| Remnant 1 | $ 14,978.64 | $ 12,510.59 | $ 11,846.51 | $ 10,784.32 |
| Remnant 2 | $ (114,225.72) | $ (95,404.63) | $ (90,340.41) | $ (127,495.68) |
| Total | $ (99,247.08) | $ (82,894.03) | $ (78,493.90) | $ (111,211.36) |

Total Cashflow

| Period → | 91 | 182 | 271 | 364 |
|---|---|---|---|---|
| Total Cashflows | $ 2,830,534.46 | $ 2,799,119.33 | $ 2,851,287.64 | $ 2,770,802.00 |

FIG. 11

Gross Notional = 432,212,698.82

| Remnant | Fixed Rate* | Spread* | Fixed Rate | Spread | Notional |
|---|---|---|---|---|---|
| Remnant 1 | 2.6478 (High) | 0.00707757 | 2.6478 | 0 | (50,106,349.41) |
| Remnant 2 | 1.8682 (Low) | (calculated spread) | 1.87527757 | 0.00707757 | 382,106,349.41 |
| | | Gross Notional | (Fixed Rate* + Spread*) | | 432,212,698.82 |

| | FIXED CASH FLOWS | | | |
|---|---|---|---|---|
| Period → | 91 | 182 | 271 | 364 |
| Remnant 1 | $ (668,810.20) | $ (657,905.70) | $ (657,905.70) | $ (657,905.70) |
| Remnant 2 | $ 3,612,224.82 | $ 3,553,329.85 | $ 3,612,224.82 | $ 3,553,329.85 |
| Total | $ 2,943,414.60 | $ 2,895,424.15 | $ 2,895,424.15 | $ 2,895,424.15 |

| | FLOAT CASH FLOWS | | | |
|---|---|---|---|---|
| Period → | 91 | 182 | 271 | 364 |
| Remnant 1 | $ 14,976.64 | $ 12,510.59 | $ 11,046.51 | $ 10,764.33 |
| Remnant 2 | $ (127,865.79) | $ (108,815.40) | $ (103,973.47) | $ (141,406.46) |
| Total | $ (112,889.14) | $ (96,304.89) | $ (92,926.96) | $ (130,642.14) |

Total Cashflow

| Period → | 91 | 182 | 271 | 364 |
|---|---|---|---|---|
| Total Cashflows | $ 2,830,534.46 | $ 2,799,119.33 | $ 2,851,287.64 | $ 2,770,802.00 |

COMPRESSION OF FLUCTUATING DATA

PRIORITY

This application claims the benefit of U.S. patent application Ser. No. 17/962,921, now U.S. Pat. No. 11,907,207, filed Oct. 10, 2022, and entitled Compression of Fluctuating Data, which claims the benefit of U.S. Provisional Patent Application No. 63/254,686, filed Oct. 12, 2021, and entitled Compression of Fluctuating Data, which is incorporated by reference herein in its entirety.

RELATED APPLICATIONS

The following are incorporated by reference in their entirety:
U.S. Pat. No. 10,609,172, filed on Dec. 5, 2017 and granted on Mar. 31, 2021;
U.S. Pat. No. 10,572,939, filed on Aug. 29, 2016 and granted on Feb. 25, 2020;
U.S. Pat. No. 10,319,032, filed on Jul. 22, 2014 and granted on Jun. 11, 2019;
U.S. Pat. No. 10,475,123, filed on Jul. 22, 2014 and granted on Nov. 12, 2019; and
U.S. Pat. No. 10,140,659, filed on Oct. 7, 2015 and granted on Nov. 27, 2018.

BACKGROUND

While costs associated with computers and memory storage devices have been falling as the underlying technologies are improved, available computing resources of organizations remain at a premium. For example, as businesses increasingly move towards electronic communications, electronic processing of business processes, and electronically monitoring of these communications and business processes, memory usage and computing processing power needs also correspondingly increase. In many cases, computing centers tasked with implementing and maintaining these electronic communications, business processes and data records are constrained by existing or aging hardware and software resources, and budgetary concerns regarding the purchase, upgrade, or repair of the hardware and software infrastructure components. This may be true for large or small business organizations.

In an illustrative example, a large organization may have many clients engaging in large numbers of electronic transactions, the details of which may be stored in memory or other electronic storage device, or communicated via electronic communications networks, etc. In many cases, these electronic transactions for multiple clients may occur continually and/or concurrently and be maintained over a substantial duration of time. As such computing resources, such as memory/storage, may be depleted and additional resources may need to be added to the system. Additionally, the data stored may be communicated between computing systems for processing. These communication requirements may result in slowed communications capability, as communication bandwidth on an organization's network may be a finite, limited resource.

As such, a need has been recognized for improved data management capabilities, in storage capacity and transmission bandwidth management, while maintaining the desired parameters/business value of the underlying data.

For example, computer systems and networks are commonly used to electronically trade securities and derivatives, such as futures and options contracts or over the counter instruments, such as interest rate swaps. These computer systems and networks may be tasked with processing, communicating and storing data indicative of numerous positions created and held by traders which may be created, processed, stored, communicated and removed over periods of time which may span weeks, months or even years.

Accordingly, the ability to reduce the volume of such data would be useful so as to reduce the amount of computational resources needed for the processing, communication and/or storage thereof.

BRIEF DESCRIPTION OF THE DRAWINGS

FIG. 7 depicts sample set of IRS positions to compress, according to some embodiments.

FIG. 8 depicts the net weighted notional values for the positions of FIG. 7, according to some embodiments.

FIG. 9 depicts the original blending group FIG. 7 showing the cash flows to be replicated.

FIG. 10 depicts the blending result according to some embodiments.

FIG. 11 depicts the remnant spread calculation according to some embodiments.

DETAILED DESCRIPTION

Figure 1:
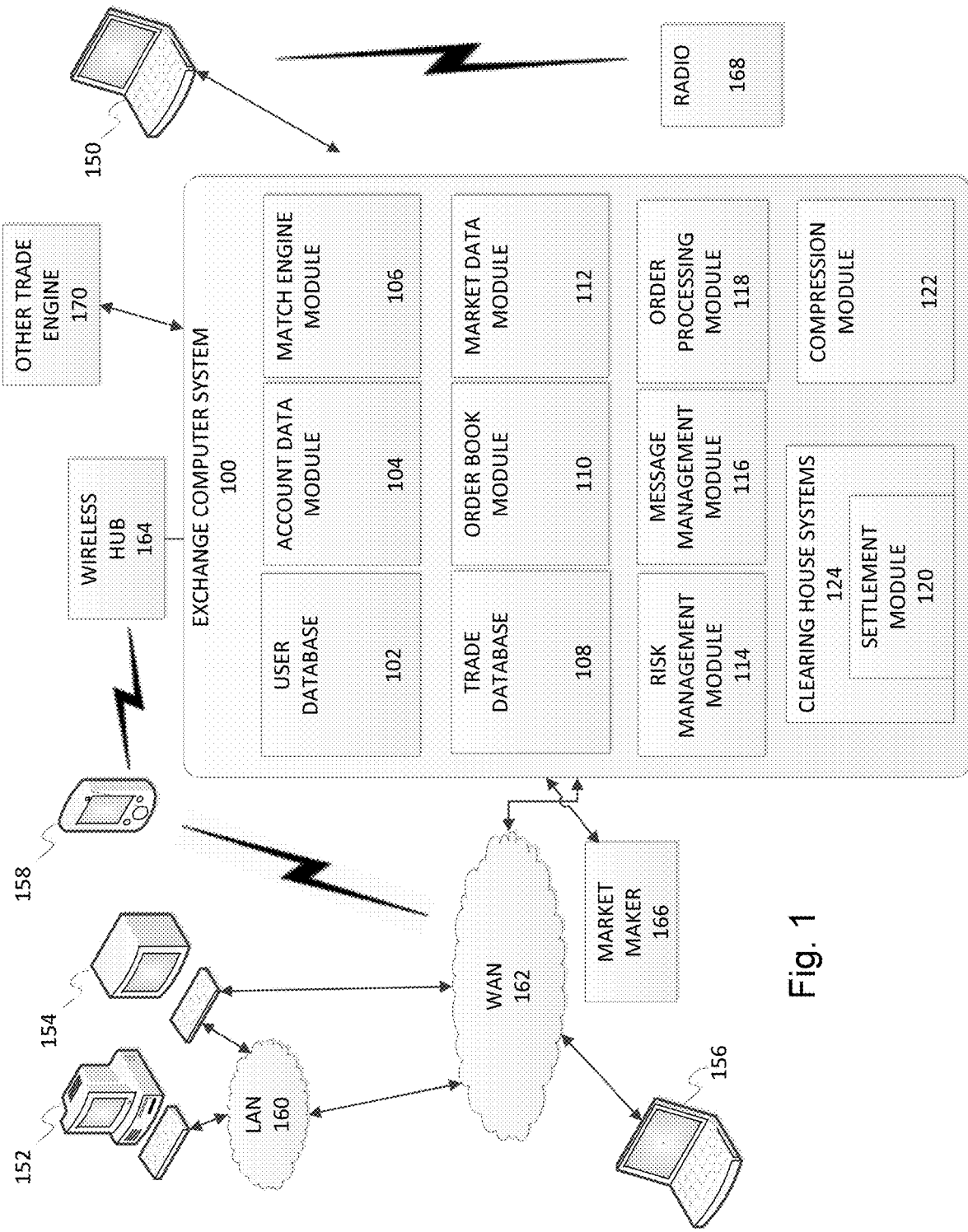
FIG. 1 depicts an electronic trading computer network system, according to some embodiments.

The disclosed embodiments relate to a computer implemented system and process which improves on the ability of an exchange computer system, or the clearing component thereof, to manage and reduce the amount of data storage and other computational resources required to store data indicative of positions held by traders in interest rate swap (IRS) instruments. The disclosed embodiments may be deployed by the electronic trading system or as an adjunct service accessible thereby. More particularly, the disclosed embodiments enable the exchange computer system to unilaterally compress the data indicative of a wider variety of positions in IRS instruments held in a portfolio, particularly those positions which vary as to their fixed rate and/or their spread. This improves upon the ability to reduce the data size of the portfolio.

In some implementations, the reduction in data size may be performed using a zero-value-spread compression scheme. In an example zero-value-spread compression scheme, multiple data elements representative of swaps may be compressed into fewer remnant data elements associated with adjusted fixed rates and zero-value spreads. Although the zero-value-spread compression scheme is able to reduce data size and preserve total cash flows, loss that occurs during the zero-value-spread compression scheme may result in inconsistencies with regard to the ratio of fixed interest rate and floating interest rate cash flows of the swap positions being compressed (e.g., despite preservation of the total flow). The techniques and architectures discussed herein provide for compression loss correction by computation of one or more remnant spread values that may be associated with one or more of the remnant data elements. Conventional systems do not have a method for fixed/float ratio loss correction resulting from data compression. The techniques and architectures discussed herein provide a technical solution to the problem of data compression loss through correction/compensation via use of remnant spread values. Thus, the compression techniques may be applied to a variety of data elements (including data elements storing spread values associated with swaps) that may undergo loss when compressed using zero-value-spread compression schemes.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

In one example, electronic trading involves traders transmitting electronic data transaction request messages, e.g., to buy or to sell a quantity of a financial instrument, to an exchange computing system that includes one or more hardware match engines that match, or attempt to match, the incoming data transaction request messages with one or more previously received request counter thereto that have not yet been satisfied.

In another example, traders may enter into a transaction away from the exchange computing system, e.g., a bilateral trade negotiated directly between those traders. Once a trade is agreed upon, those parties may submit the details of their transaction to the exchange computing to have the transaction cleared as will be described.

Once a trade event occurs, e.g., two of the transaction requests are matched either by the matching engine or bilaterally between the parties and submitted to the exchange computing system, the result is that the market participants involved in the match have positions which may be cleared by the exchange computing system, wherein clearing is generally a process by which the obligations of each trader are reconciled, recorded/stored and communicated to the necessary parties, etc.

Given that thousands or even millions of such transactions may occur on a daily basis, the volume of data that electronic trading systems must process and store can be substantial. Accordingly, mechanisms to reduce the amount of data may be necessary. The process of reducing this data may be referred to as "compression." Generally, compression in the computing context refers to reducing the amount of data necessary to represent some particular information, either faithfully without any loss of the information represented (lossless), or approximately with some acceptable loss of some of the information represented (lossy). Compression may be accomplished using encoding or replacement of data. In the context of the exchange computing system, compression of portfolio data generally aims to reduce the amount of data indicative of financial positions held by one or more traders while preserving the overall/aggregate economic and/or risk characteristics created by those positions, either within a given portfolio, i.e., unilaterally, or between multiple portfolios, i.e., multilaterally, as will be described. It is typically not required to preserve any data indicative of original uncompressed positions so long as the overall/aggregate economic and/or risk characteristics created by those positions is maintained.

One method of reducing or otherwise compressing the amount of data processed and stored in an electronic trading system, particular for data indicative of the positions held by the traders, is referred to as netting or offsetting. Netting/offsetting is a unilateral process whereby opposing positions held by the same entity, e.g., trader, which, effectively, partially or entirely cancel each other out, e.g., identical but for side (buy/sell) and possibly quantity, may be recognized and the data indicative thereof eliminated from the system. That is, the data size of the portfolio, the actual number of positions, or gross notional value are reduced but the net financial characteristics of that portfolio, e.g., the net notional value, risk profile, delta, etc., remain either at least substantially unchanged prior to and after the netting/offsetting is applied, or within trader-accepted/specified tolerances/constraints. It will be appreciated that the requirement that one or more characteristics remain unchanged before and after compression may itself be a constraint on the compression process. As used herein, netting and offsetting both refer to the removal of a negated position, or portion thereof, and not merely the discounting of a value thereof for certain calculations such as margin calculation.

For example, if a trader enters into identical but opposing positions to buy and sell the same quantity of the same item at the same price, those positions may cancel each other out and therefore may be eliminated, wherein the net notional value and/or risk profile of the portfolio remains the same. In some cases, one position may be offset by multiple other positions which, in combination, offsets or otherwise cancels out the position, e.g., a buy order for a given quantity is offset by the sum of the quantities of multiple opposing sell orders. In electronic trading systems which anonymize and novate transactions, i.e., where the trading system substitutes itself as the buyer to the seller and seller to the buyer in each transaction, such as a futures trading system, this unilateral process of netting/offsetting may be readily implemented as each trader's portfolio, and the data indicative thereof, may be evaluated in isolation from the data of other traders to remove opposing positions held by a single trader without affecting those other traders. Offsetting may be applied by analyzing a portfolio of positions to identify existing opposing positions which may be offset. Furthermore, each trader may analyze their own portfolio and specifically enter into offsetting positions in order to trigger the offsetting function to remove particular positions from their portfolio if they so choose. Alternatively, or in addition thereto, a system may be implemented by the electronic trading system, such as the clearing component/system, which may analyze a portfolio of positions, subject to constraints, and generate suitable positions, or transactions which would result in such offsetting positions, to offset and reduce the data size thereof while remaining within given constraints, i.e., the system would generate counter positions in the portfolio to offset existing trader-generated positions which would effectively reduce the number of positions, while one or more characteristics of the portfolio remain within specified constraints, e.g., remain unchanged. Such systems may automatically, such as based on the data size of a portfolio of positions exceeding a threshold amount, enact such transactions to reduce a portfolio size or may submit the generated transactions to the traders as recommendations to accept or not, in whole or in part. For example, such a system may recognize that two related trader-generated positions may be offset by a single counter-position resulting in a net reduction of one position, wherein the single counter position has the same effect on the portfolio's net notional value, risk profile or other characteristics.

Similar to exchange traded instruments, such as futures contracts, which involve purchase or sale of an obligation to occur at a later date, over-the-counter (OTC) products include financial instruments, i.e., derivatives, which involve obligations to occur at a later date but which are bought, sold, traded, exchanged, and/or swapped directly between counterparties instead of via an exchange, i.e., bilaterally. OTC products may further include periodic obligations, such as the periodic payment of interest, during the life of the position. OTC instruments include interest rate based instruments, such as forward swaps, interest rate swaps, described in more detail below, basis swaps, and currency based instruments, such as foreign exchange (FX) instruments.

Many OTC instruments/derivatives exist to fill a wide range of needs for the counterparties who buy and sell them, including limiting or mitigating exposure to risks and/or maximizing cash flow. After transacting an OTC product, counterparties may expend resources managing their position in that product for the duration of its life. Management of such data may be complicated based on the number of exchanges and/or the specific terms of the contract. As noted above, each such position may be represented by data stored in and processed by an electronic record keeping system, such as an electronic clearing system.

An interest rate swap (IRS) is an example of a type of OTC product where the parties agree to exchange streams of future interest payments, e.g., floating vs fixed interest rates, based on a specified principal or notional amount. Each stream, e.g., the floating rate stream and the fixed rate stream, may be referred to as a leg. Swaps are often used to hedge certain risks, for instance, interest rate risk. They can also be used for speculative purposes. An example of a swap includes a plain fixed-to-floating, or "vanilla," interest rate swap. The vanilla swap includes an exchange of interest rate streams, payments or cash flows where one interest rate stream/payments/flow is based on a floating rate and the other interest rate stream/payments/flow is based on a fixed rate. In a vanilla swap, one party makes periodic interest payments to the other based on a fixed interest rate. In return for the stream of payments based on the fixed rate, that party may receive periodic interest payments based on a variable rate from the other party. The payments are calculated over the notional amount defined in the contract. The variable rate may be linked to a periodically known or agreed upon rate for the term of the swap such as the London Interbank Offered Rate (LIBOR) or Secure Overnight Funding Rate (SOFR). This rate is called variable, because it is reset at the beginning of each interest calculation period to the then current reference rate, such as the LIBOR published rate.

The components of a typical IRS may be defined in a swap confirmation which is a document that is used to contractually outline the agreement between the two parties. The components defined in this agreement may include:

Notional—The fixed and floating coupons are paid out based on what is known as the notional principal or just notional. If one were hedging a loan with $1 million principal with a swap, then the swap would have a notional of $1 million as well. Generally the notional is never exchanged and is only used for calculating cash flow amounts;

Fixed Rate—This is the rate that will be used to calculate payments made by the fixed payer. This stream of payments is known as the fixed leg of the swap;

Coupon Frequency—This is how often coupons would be exchanged between the two parties, common frequencies are annual, semi-annual, quarterly and monthly though others are used such as based on future expiry dates or every 28 days. In a vanilla swap the floating and fixed coupons would have the same frequency but it is possible for the streams to have different frequencies;

Business Day Convention—This defines how coupon dates are adjusted for weekends and holidays. Typical conventions are Following Business Day and Modified Following;

Floating Index—This defines which index is used for setting the floating coupons. One common index is LIBOR. The term of the index will often match the frequency of the coupons. For example, 3 month LIBOR would be paid Quarterly while 6 month LIBOR would be paid Semi-Annually;

Daycount conventions—These are used for calculating the portions of the year when calculating coupon amounts;

Effective Date—This is the start date of a swap and when interest will start accruing on the first coupon; and Maturity Date—The date of the last coupon and when the obligations between the two parties end.

Interest rate swaps may further specify a spread value which is an adjustment or compensating value added to the payments required by either party to the other party. While historically uncommon, a spread may be negotiated by the parties, such as an additional adjustment to the floating rate on which the floating rate payments are based. For example, the parties may negotiate the floating rate to be a particular interest rate, e.g., LIBOR, plus 2% where the 2% is the spread. So when a party is to make a floating rate payment and the LIBOR rate is presently 3%, the party will pay 5% (3%+the 2% spread). Often the spread is specified in terms, or as a function, of the fixed rate defined by the IRS contract, e.g., fixed rate+0.25%.

The parties to an IRS swap generally utilize these transactions to limit, or manage, exposure to fluctuations in interest rates, or to obtain lower interest rates that would otherwise be unobtainable. Usually, at least one of the legs to a swap has a variable rate. The variable rate may be based on any agreed upon factors such as a reference rate, the total return of a swap, an economic statistic, etc. Other examples of swaps include total return swaps, and Equity Swaps. The expiration or maturity of the future streams of payments may occur well into the future. Each party may have a book of existing and new IRSs having a variety of maturity dates. The parties may expend substantial resources tracking and managing their book of/portfolio of positions in IRSs and other OTC products. In addition, for each IRS, the party maintains an element of risk that one of its counterparties will default on a payment. Currently, financial institutions, such as banks, trade interest rate payments and/or interest rate swaps over the counter. Streams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, which frequently changes, the fixed rates associated with two different swaps will rarely be the same. As such, each swap that is struck causes a separate line item indicative of the position to be booked, i.e., data indicative thereof stored in relevant record keeping data storage systems, until an opposite swap with the same fixed rate is struck which may allow for offsetting/netting positions to be removed, as was described above.

Market participants, e.g., banks, traders or clearing firms, may be associated with large portfolios comprising hundreds, thousand, or even millions of positions that eventually will be cleared. A market participant portfolio, which includes open interest/positions, is associated with a computing cost as well as a financial cost. From a computing resources standpoint, the exchange/clearing computing system may store all of the post-trade positions associated with a trader, i.e., the trader's portfolio, in a data file, which may be processed and managed by the exchange computing system, and which may then be transmitted over a network to other institutions, such as regulators, or banks, or any other financial institution. Open positions may be represented as data elements in the data file.

In addition to the technical costs, many financial institutions that work with the exchange computing system require traders to post capital requirements that are based on the open interest associated with each trader. Thus, in addition to the computing costs of maintaining, processing and transmitting large data files with many data elements, open interest may also trigger capital requirements, which can burden traders and reduce the overall amount of trading that can be performed by the trader.

As was described above, in a typical futures trading environment, the standardization of futures contracts and the nature of the central counterparty based trading system, e.g., the process of novating trades, allows an Exchange, or market participant thereof, to net/offset together offsetting, e.g., opposing, positions in the same contract for the purpose of, for example, reducing the margin requirement to reflect the reduced risk of loss of such positions and/or to outright consolidate positions to reduce the size, e.g., data size, of the portfolio and/or reduce transaction fees therefore. As the Exchange, being a central counterparty to all transactions, ensures that each counter-party is not at risk of loss due to the default of the other party, such netting and consolidation by one market participant does not affect the positions and risk undertaken by another participant.

In the case of OTC contracts, such as IRS contracts, however, the variability in the characteristics of positions which may exist in any given portfolio, such as the fixed interest rate, maturity date, coupon, etc. makes it difficult to identify suitable positions for netting/offsetting though, for example, such positions, though not identical, may exist which are similar enough as to represent a reduced risk of loss meriting a reduction in the margin requirement. However, under certain circumstances, unilateral compression techniques, i.e., netting/offsetting, may be applied to reduce the data size of a given trader's portfolio of OTC/IRS positions, particularly where such compression does not affect the risk profile characterized by the compressed positions. For example, where the fixed rate and other economic characteristics of multiple IRS positions are identical, netting/offsetting may be applied.

Where one or more of the parameters of multiple IRS positions, e.g., the fixed rate, are not identical, a process of blending, also referred to as coupon blending, may be applied, wherein replacement positions, referred to as remnant swaps, are computed to match the fixed and floating cash flows of a set of IRS positions to be replaced thereby in the portfolio, e.g., one remnant swap to replicate the fixed leg cash flows and another remnant swap to replicate the floating leg cash flows of the set of IRS positions to be replaced. Where the set of IRS positions to be replaced is greater than two, the blending process results in a net saving by replacing the data associated with those line items in the portfolio with data representative of the two computed remnant swaps wherein the economic characteristics of the portfolio, e.g., the overall cash flows, remain unchanged.

However, further complicating this process is the bilateral nature of an IRS contract where a particular position of one party is coupled with a counter position of a counter-party thereto, i.e., via the periodic exchange of interest rate payments. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not necessarily be consolidated/compressed, e.g., netted and removed, where such compression necessarily affects, not only the economic purpose intended by the market participant holding that portfolio, but also the economic purposes, which may be different, of any counter party market participants thereto. Accordingly, opportunities to compress, i.e., remove positions from, a multilateral portfolio, i.e., a set of portfolios of bilateral positions, to reduce a data size thereof, and/or reduce margin requirements and/or transactional fees for IRS contract portfolios, may be more limited than in the context of centrally counterparty based systems. Further, any such effort to compress, i.e., using multilateral compression techniques, a multilateral portfolio requires looking across the portfolios of multiple traders to identify positions, and their counter positions, as well as the necessary offsetting positions, which may be compressed.

As will be described, the disclosed embodiments are implemented by the electronic trading system and/or an adjunct system thereto, and as such, have unique access to the data indicative of all of the positions in each of the market participants' portfolios, this collection referred to as a multilateral portfolio. Accordingly, the disclosed embodiments, in addition to enabling unilateral compression, may perform a function, i.e., multilateral portfolio compression, that individual market participants are unable to do themselves as they may not have access to the data indicative of other market participants' portfolios/positions.

The disclosed system, as will be described, having access to the multilateral portfolio, may, in one embodiment, look across individual trader portfolios in order to recognize and/or compute multilateral compression opportunities, e.g., as between linked swap positions, etc. As was mentioned above, such offsetting may be applied by analyzing a portfolio(s) of positions to identify existing opposing positions which may be offset, while maintaining specified attributes of the portfolios within specified constraints, such as substantially identical pre- and post-compression. Furthermore, each trader may analyze their own portfolio and may specifically enter into offsetting positions in order to attempt, e.g., if they have knowledge of linked positions held by other traders, to trigger the offsetting function to remove particular positions from their portfolio if they so choose. Alternatively, or in addition thereto, a system may be implemented by the electronic trading system, such as the clearing component/system, which, as will be described, may analyze one or more portfolios of positions, alone or in combination, and generate suitable positions, or transactions to one or more portfolios which would result in such positions, to offset and reduce the data size thereof while maintaining any constrained characteristics of the affected portfolios, i.e., the system would generate counter positions in the one or more portfolios to offset existing trader-generated positions which would effectively reduce the number of positions while ensuring that specified characteristics of those portfolios meet specified constraints. Such systems may automatically enact such transactions to reduce a portfolio size or may submit the generated transactions to the traders as recommendations to accept or not. For example, such a system may recognize that two related trader-generated positions in different portfolios may be offset by a single counter-position in one of those portfolios resulting in a net reduction of one position and a commensurate reduction in data size.

Various solutions for identifying positions within (unilateral) individual and across (multilateral) multiple portfolios of a multilateral portfolio for multilateral compression have been developed. See., e.g., U.S. Pat. Nos. 8,494,953; 10,319,032; 10,475,123; 10,609,172; 10,650,457; 10,789,588; 10,884,988; 10,896,467; 10,992,766; and 11,004,148, as well as U.S. Patent Application Publication Nos. 2013/0282554 A1; 2020/0356990 A1; 2021/0097620 A1; 2021/0211516 A1; and 2021/0217086 A1, all of which are incorporated by reference herein. Such solutions may involve linear optimization systems/techniques which are used by electronic trading systems to analyze a collection of portfolios belonging to multiple traders, e.g., a multilateral portfolio, in order to identify positions which may be netted and/or calculate new positions which may then create netting opportunities. In many such cases, these systems, once suitable positions are identified, may generate new positions, or transactions which, when processed, create those new positions, for a subset of the traders to replace multiple positions held thereby, where the new positions are fewer than those that are to be replaced, thereby reducing the data size of the data indicative of the portfolios, but are characterized by the same economic or other parameters, e.g., they represent/create/maintain the same cash flow and/or risk profile as the positions which are to be removed.

For example, systems and methods are described for reducing notional amount and/or clearing line items associated with swaps that are on an organization's books. In some cases, a method for reducing a notional amount and/or clearing line items associated with a portfolio of swaps may include determining at least a first fixed rate for use in blending a plurality of swaps. Each of the swaps may have matching economics and a different associated fixed rate. The method may further include determining, by one or more computing devices, a first remnant swap using the first fixed rate and determining a second remnant swap using a second fixed rate, wherein the second fixed rate is different than the first fixed rate.

In some cases, a non-transitory computer-readable medium may contain computer-executable instructions, that when executed by a processor, cause one or more computing devices to determine a first blend rate for use in blending a plurality of swaps. Each of the plurality of swaps may have matching economics and a different associated fixed rate. The instructions may further cause the one or more computing devices to determine a first remnant swap using the first blend rate and to determine a second remnant swap using the second blend rate to blend the plurality of swaps.

In some cases, a system for reducing notional amount and/or clearing line items associated with swaps that are on an organization's books may include a network and one or more computing devices. The computing devices may include a processor and one or more non-transitory memory devices storing instructions that, when executed by the processor, cause the one or more computing devices to determine a first blend rate and a second blend rate for use in blending a plurality of swaps. Each of the plurality of swaps may have matching economics and a different associated fixed rate. The instructions may further cause the one or more computing devices to determine a first remnant swap using the first blend rate and determine a second remnant swap using the second blend rate to blend the plurality of swaps together with first remnant swap. The one or more computing devices may then communicate, via the network, information corresponding to the first remnant swap and the second remnant swap to an institution associated with the plurality of swaps.

In some cases, a method for compressing a portfolio of swaps may be implemented by a computer device and include determining a fixed rate for use in blending a plurality of swaps, where each of the plurality of swaps may have matching economics and a different associated fixed rate. A computing device may further determine a blended swap for blending the plurality of swaps using the fixed rate, wherein a gross notional of the blended swap could be less than the gross notional amount for the plurality of swaps and/or reducing the number of clearing line items.

In some cases, clients may desire to enter into one or more swaps (e.g., In some cases, multiple line items having the same interest rate may be collapsed together (e.g., canceled). For example, a pay swap having an associated first notional amount of may be offset by a second notional amount associated with a receive swap when the pay and receive swaps have the same interest rate. However this is rare. For example, a swap participant may use an investment strategy for achieving the same fixed rate for two or more different swaps. In such cases, the customer may specify a desired rate for a swap when contacting a dealer. While the dealer may be able to find a counter-party willing enter into a swap at that rate, the swap may incur a fee to equalize the economics of the swap. For example, at the desired fixed rate, the economics of the swap may favor the paying party or the receiving party. By equalizing these differences, the swap may then be structured to allow the total value of the fixed rate leg to be equal to the floating rate leg of the swap. In general, when the interest rates are determined for the swaps, the precision may be specified by one or more parties to the swap. In some cases, the precision of the rates may be limited to a defined precision common to the market, such as about 2 decimal places, about 5 decimal places, up to 7 decimal places. In other cases, the rate precision may be specified to be a precision greater than 7 decimal places, such as 11 decimal places, up to 16 decimal places, etc.)

In some cases, a clearing house may monitor a portfolio of swaps to determine whether any of the total notional value of the swap portfolio may be canceled or otherwise offset. For example, the clearing house may, on a periodic (e.g., daily) basis, process an algorithm to determine a net value of a client's swap portfolio and send a message to the client to terminate a line item, or offset at least a portion of the gross notional value when two or more line items may be collapsed.

In the past, the over-the-counter swap market was largely a bespoke market, where a customer desiring to enter into a swap would contact, such as by telephone, one or more dealers to determine which dealer would offer the best price to enter into the deal. In such cases, the swap may be entered on a common platform, but the trade execution was completed by phone. Because swaps may not be fully transparent, governmental regulations have required that swaps be executed via a Swap Execution Facility (SEF). A SEF is a regulated platform for swap trading that provides pre-trade information, such as bids, offers, and the like, and/or an execution mechanism to facilitate execution of swap transactions among eligible participants. Over time more and more types of swaps may be executed via a SEF, such as interest rate swaps. Because the SEF may operate using a more automated swap market mechanism, the likelihood that a customer may enter into different swaps, where each share a same interest rate will become increasingly rare. A SEF may execute many swaps with multiple coupons at a centralized location. In some cases, different swaps may share the same, or similar, economics to another swap. However, the coupons are likely to differ due to the swaps executing at different times. As such a client may quickly build a book (e.g., swap portfolio) with many swap line items, which, in turn, would require the client to incur a large capital obligation corresponding to the gross notional and/or the total clearing line items of the book of swaps.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 124 may be included as part of exchange computer system 100 and configured to carry out clearinghouse operations. Module 124 may receive data from and/or transmit data to trade database 108 and/or other modules of computer system 100 regarding trades of futures contracts, futures contracts options, OTC options and contracts, and other financial products. Clearinghouse module 124 may facilitate the financial product exchange acting as one of the parties to every traded contract or other product. For example, computer system 100 may match an offer by party A to sell a financial product with a bid by party B to purchase a like financial product. Module 124 may then create a financial product between party A and the exchange and an offsetting second financial product between the exchange and party B. As another example, module 124 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 124 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-124).

Computer devices 150-158 is shown directly connected to exchange computer system 100. Exchange computer system 100 and computer device 150-158 may be connected via a T1 line, a common local area network (LAN) or other mechanism for connecting computer devices. Computer device 150 is shown connected to a radio 168. The user of radio 168 may be a trader or exchange employee. The radio user may transmit orders or other information to a user of computer device 150. The user of computer device 150 may then transmit the trade or other information to exchange computer system 100.

Computer devices 152 and 154 are coupled to a LAN 160. LAN 160 may implement one or more of the well-known LAN topologies and may use a variety of different protocols, such as Ethernet. Computers 152 and 154 may communicate with each other and other computers and devices connected to LAN 160. Computers and other devices may be connected to LAN 160 via twisted pair wires, coaxial cable, fiber optics, radio links or other media.

A wireless personal digital assistant device (PDA) 158 may communicate with LAN 160 or the Internet 162 via radio waves. PDA 158 may also communicate with exchange computer system 100 via a conventional wireless hub 164. As used herein, a PDA includes mobile telephones and other wireless devices that communicate with a network via radio waves.

FIG. 1 also shows LAN 160 connected to the Internet 162. LAN 160 may include a router to connect LAN 160 to the Internet 162. Computer device 156 is shown connected directly to the Internet 162. The connection may be via a modem, DSL line, satellite dish or any other device for connecting a computer device to the Internet. Computers 152, 154 and 156 may communicate with each other via the Internet 162 and/or LAN 160.

One or more market makers 166 may maintain a market by providing constant bid and offer prices for a derivative or security to exchange computer system 100. Exchange computer system 100 may also include trade engine 170. Trade engine 170 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer devices 150-158 may include computer-executable instructions for receiving market data from exchange computer system 100 and displaying that information to a user. As another example, clearinghouse module 124 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

EXEMPLARY EMBODIMENTS

In some cases, the clearinghouse module 124 may be configured to monitor and/or otherwise manage a capital obligation associated with a plurality of swaps, such as a swap portfolio. In at least some embodiments, the exchange computer system 100 (or "system 100") receives, stores, generates and/or otherwise and processes data. In accordance with various aspects of the disclosed embodiments, a clearinghouse (e.g., the clearinghouse module 124) may act as a guarantor of the agreement for the derivative. As discussed above, a derivative (e.g., an over the counter swap) may be cleared and guaranteed by the clearinghouse. This may promise more interesting capital efficiencies to allow institutions to reduce a capital charge associated with a plurality of swaps, such as by reducing a gross notional and/or reducing line items associated with the plurality of swaps.

In one embodiment, the disclosed compression processes may be applied automatically to all trader's portfolios or may be applied only to select portfolios, or only select portions (positions/line items), thereof, at the option of the associated trader, e.g. via configuration parameters set by the trader. Whether applied to all or only select portfolios, or portions thereof, the disclosed systems may be automatically applied periodically, such as at the close of the trading day, or on as needed basis, e.g., where the data size of the portfolio, or portion thereof, to be compressed exceed a particular size threshold. In one embodiment, the disclosed compression process may be further manually triggered at the discretion of a trader or an entity operating the clearing house or the exchange computing system.

Figure 3:
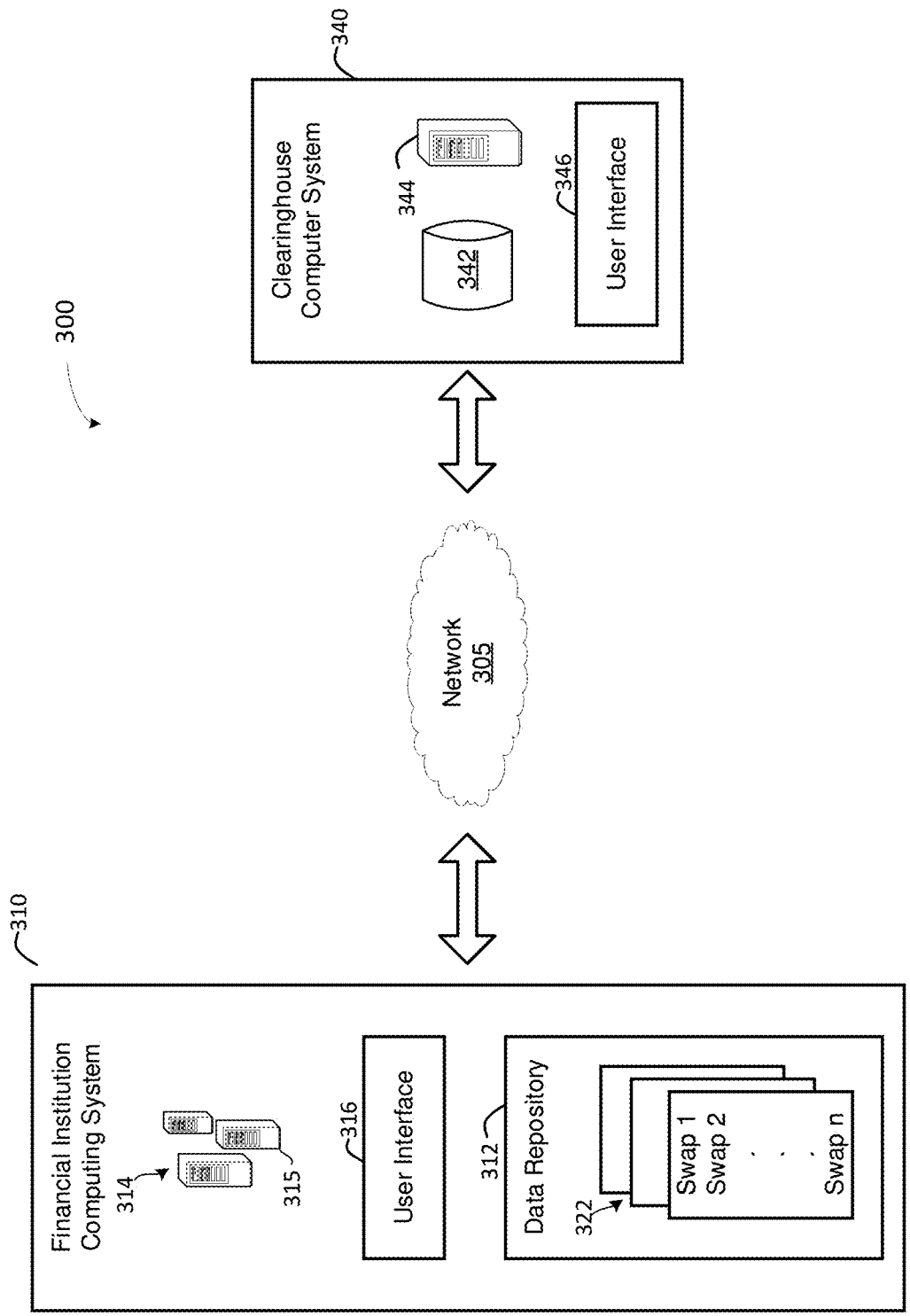
FIG. 3 depicts a block diagram of a portion of an illustrative system for blending coupons associated with a plurality of swaps according to one embodiment.

FIG. 3 shows a portion of an illustrative system 300 for blending coupons associated with a plurality of swaps in accordance with one embodiment. In some cases, the illustrative system 300 may include a financial institution computing system 310 communicatively coupled to a clearinghouse computer system 340 via a network 305 (e.g., a wide area network (WAN), the LAN 124, the Internet 126, etc.). The financial institution computing system 310 may include a data repository 312, one or more computing devices 314, and, in some cases, at least one user interface 316. In some cases, the data repository 312 may store information about one or more swap portfolios 322, where the swap portfolios may include information about two or more different swaps (e.g., swap 1, swap 2, swap n, etc.). For example, the swap information may include a fixed rate value, a floating rate value, a notional value, and/or a cash value for each of the plurality of different swaps of the swap portfolios 322. In some cases, the swap portfolios 322 may be associated with the financial institution, and/or one or more different customers of the financial institution. For example, a financial entity and/or a customer of the financial entity may desire to enter into one or more different swaps to hedge financial risk due to a plurality of fixed rate holdings and/or a plurality of floating rate holdings. In some cases, a computing device 315 and/or the user interface 316 may be used to facilitate user access to the one or more swap portfolios 322. For example, a user may log into the financial institution computing system 310 via one or more user interface screens accessible via the user interface 316. In some cases, the user interface 316 is at a geographical location local to the financial institution computer system 310 and/or at a geographical location of the user.

In some cases, the clearinghouse computer system 340 may include one or more of a data repository 342, a computer device 344 and/or a user interface 346. The clearinghouse computer system 340 may be communicatively coupled to at least one financial institution computer system, such as the financial institution computing system 310 via the network 305. In some cases, the clearinghouse computer system 340 may be configured to obtain information about one or more of the swap portfolios 322, process the information to blend coupons associated with the different swaps of the swap portfolios 322 and communicate information about the blended swaps to the financial institution computing system 310 to reduce one or more line items associated with the swap portfolios 322 and/or to reduce a gross notional value associated with the swap portfolios 322 to reduce a total capital charge incurred by the financial institution in relation to the swap portfolios 322.

Figure 4:
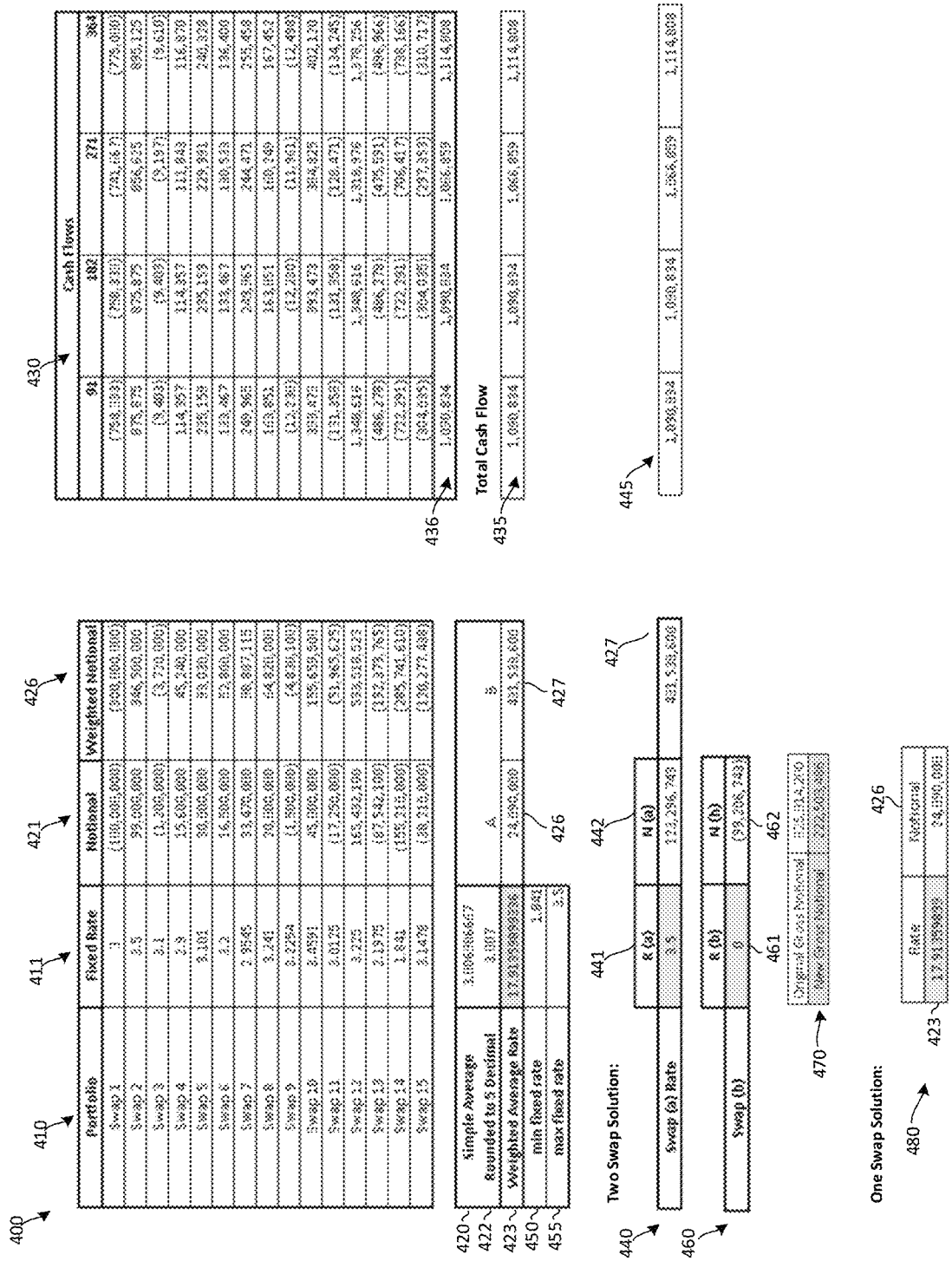
FIG. 4 depicts data tables illustrative of a method for blending coupons of a swap portfolio, according to some embodiments.

FIG. 4 illustrates data tables 400, 440, 460, and 480 illustrative of a method for blending coupons of a swap portfolio by the clearinghouse computing system 340 in accordance with aspects the disclosed embodiments. The data table 400 includes information about a plurality of swaps 410 (e.g., the swap portfolios 322) held at the financial institution, a fixed rate 411, and a notional value 421 associated with each of the swaps 410. A weighted notional 425 may be calculated as a product of the fixed rate 411 and the notional value 421 for each of the swaps 410. The data table 400 may also include fixed coupon payments (e.g., cash flows 430) associated with each of the swaps 410, which may include one or more pay swaps and one or more receive swaps. The computing device 444 may be configured to compute an average rate 420 associated with the plurality of swaps 410. While the average may be calculated with high precision (e.g., greater than 5 decimal point precision), the market may only support a lesser degree of precision. As such the computing device 344 may round the average rate 420 to a rounded rate 422 having a precision common to the financial industry (e.g., about five decimal point precision).

In blending the coupons of the swap portfolio 322, the computing device 344 may then be configured to calculate a sum 426 of the notionals 321 and a sum 427 of the weighted notionals. A weighted average rate 423 may be calculated by dividing the sum 427 of the weighted notionals by the sum 426 of the notionals. In some cases, the weighted average rate 423 may have a high precision (e.g., greater than five decimal places, about eleven decimal places, etc.) such that the cash flows 435 associated with the remnant swap(s) are equal to the total cash flows 436 for the plurality of swaps 310 in the portfolio 322.

To properly blend the swaps 410, the cash flow of the blended swap(s) must be equal to the total cash flows 436 of the swaps 410. In many cases, the resulting precision required for the coupon matching is much greater than (e.g., greater than about five decimal places, about eleven decimal places, and the like) the precision commonly supported in the financial industry. As such, different methods may be used to blend the coupons, combine line items associated with swaps, and reduce a gross notional value associated with the plurality of swaps included in a swap portfolio 322.

In some cases, the coupons of the swaps 410 may be blended into two different swaps. In some cases, the first remnant swap may be determined as shown in table 440. In a first step, a rate may be determined (e.g., a maximum fixed rate 455 associated with the portfolio, a minimum fixed rate 450 associated with the portfolio, the rounded average rate of the swaps 410, a user selected rate, a current market rate, a past market rate, etc.) for the first remnant swap and a second rate (e.g. a minimum fixed rate 450 associated with the portfolio, a maximum fixed rate 455 associated with the portfolio, a rounded average rate, a user selected rate, a current market rate, a past market rate, etc.) may be selected for the second remnant swap. For example, the second rate may be greater than or equal to 0, but less than the rate associated with the first remnant swap. The notional value of the first remnant swap may be determined using the sum the notionals of the plurality of swaps, a sum of weighted notionals of the plurality of swaps, the rate associated with the first remnant swap and the rate associated with the second remnant swap. Further, the notional of the second remnant swap may be determined based on the notional of the first remnant swap and the sum of the notional values of the portfolio of swaps 410. To properly blend the swaps 410, the cash flows 445 of the first and second remnant swaps must match the total cash flows associated with the swaps 410.

In an illustrative example, the notional value 462 of the second remnant swap may be computed by subtracting the notional 442 of the first remnant swap from the total net notional, such as the sum 426 of the notional amounts of the swaps 410. The rate 461 of the second remnant swap may be set to zero, or another desired value. When the rate of the second remnant swap is set to zero, the first remnant swap may fully account for the fixed rate components of the original swaps 410 and the second remnant swap may account for the floating rate components of the original swaps. Otherwise, both the first remnant swap and the second remnant swap each account for a mixture of the fixed rate components and the floating rate components of the original portfolio.

As can be seen, the plurality of swaps 410 has been reduced to two line items, the first remnant swap, and the second remnant swap. Further, the gross notional amount associated with the plurality of swaps 410 has been reduced from the original gross notional to a reduced gross notional amount 470.

Table 480 is illustrative of a single swap solution for blending coupons associated with the plurality of swaps 410. In this example, the single swap may be created by matching the cash flows 445 of the blended portfolio with the cash flows of the original portfolio 436. The single blended swap may be created having a rate equal to the weighted average rate 423 associated with the original portfolio and the notional value of the single swap may correspond to the sum 326 of the notional values of the original portfolio. In some cases, the rate of the single swap may be within a range of values available in a financial market. In other cases, the rate of the single swap may be outside of the range of values available in the financial market.

Figure 5:
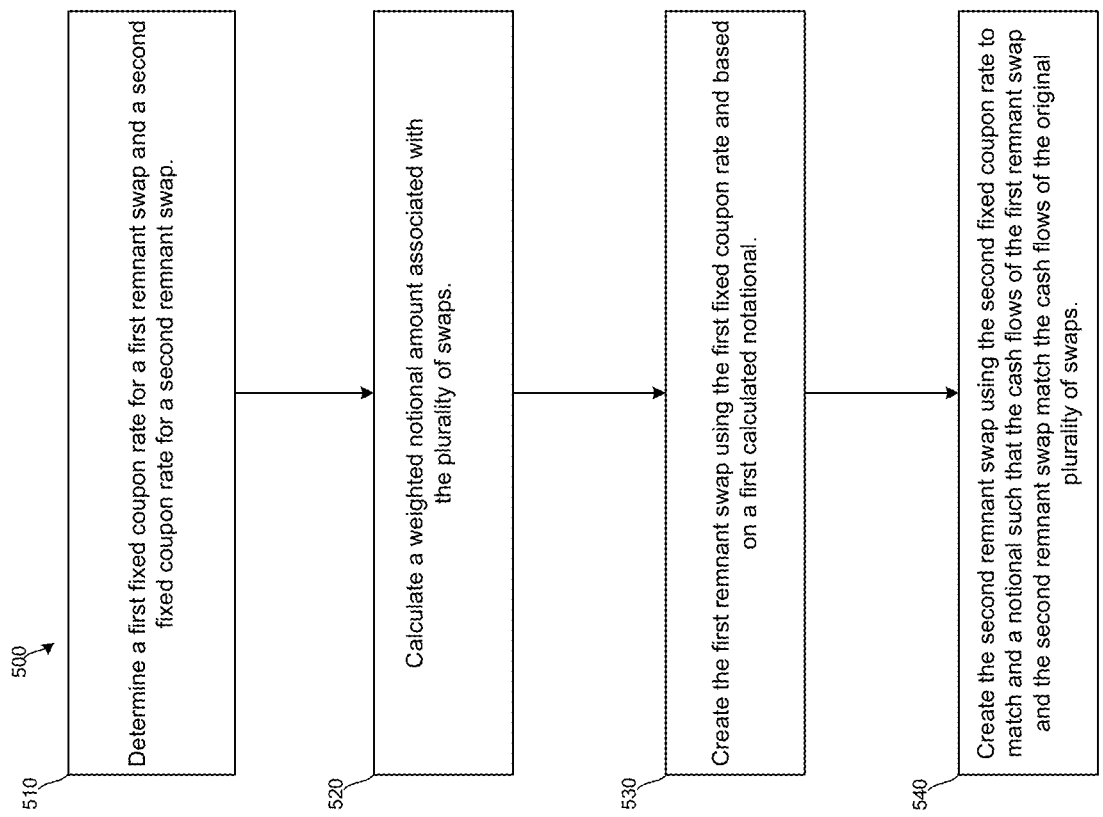
FIG. 5 depicts an illustrative flow diagram for blending coupons associated with a plurality of swap, according to some embodiments.

FIG. 5 shows an illustrative flow diagram 500 for blending coupons associated with a plurality of swaps in accordance with an aspect the disclosed embodiments. The flow diagram 500 of FIG. 5 may allow a computing device 344 to blend two or more different swaps. As discussed above, coupon blending is a form of compression that may be used to reduce notional amounts and/or line items for trades that are economically equivalent except for their fixed rates. In some cases, a goal for market participants may be to reduce capital requirements associated with a portfolio of swaps by reducing gross notional amounts and/or the number of line items associated with the swaps. Coupon blending may be accomplished for both pay swaps and receive swaps. One or more fixed rates used in blending the portfolio of swaps may be configured to lie within a range of rates associated with the different swaps included in the blended portfolio of swaps. Further, the compressed portfolio may be designed to reduce the number of line items associated with the swaps and/or reduce the gross notional corresponding to the portfolio of swaps, such as by compressing the plurality of swaps to a single swap or a pair of swaps.

In some cases, the precision of the one or more fixed rates used for compressing the portfolio of swaps may be chosen to be within a precision range commonly used in the marketplace. For example, a fixed rate may have a precision of 5 decimal places, or fewer. In other cases, the precision may be set at a number acceptable to the financial institution associated with the portfolio of swaps. For example, a financial institution may desire a rate having a precision greater than 5 decimal places (e.g., 7 decimal places, 10 decimal places, etc.)

In some cases, the blended coupon and the associated blended trade may be represented by two netting options. In some cases, a number of swaps may automatically be blended. In some cases, a user may select one or more swaps to be included and/or one or more swaps to be excluded from inclusion in the blended trade. In some cases, when an account (e.g., a portfolio of swaps) is specified for blending, a standard netting option may be applied to the account before the calculating the coupon blending method of FIG. 5. For example, for swaps having a same interest rate, the notionals of these swaps may net out automatically.

At 510, a first fixed coupon rate 441 may be determined for a first remnant swap and a second fixed coupon rate 461 may be determined for a second remnant swap. The first fixed rate 441 may be greater than the second fixed rate 461. In some cases, a simple average rate 420 of rates associated with the plurality of swaps 410 may be calculated. This simple average rate 420 may be used as either the first fixed rate 441 or the second fixed rate 461. In some cases, the first fixed rate 441 and/or the second fixed rate 461 may be chosen to have a decimal precision acceptable in the marketplace. In some cases, the first fixed rate and/or the second fixed rate 461 may be rounded according to a specified decimal precision (e.g., up to 5 decimal places, etc.). In some cases, a rate associated with the plurality of swaps may be used as the first fixed rate 441 and/or the second fixed rate 461. For example, the first fixed rate may be set to the minimum fixed rate 450, the maximum rate 455 and the like. In some cases, the second fixed rate 461 may be set to the minimum fixed rate 450, the maximum rate 455 and the like, where the first fixed rate 441 may be greater than the second fixed rate 461. In an illustrative example, the first fixed rate 441 may be set to the maximum fixed rate 455 associated with the portfolio and the second fixed rate 461 may be set to a value less than the maximum fixed rate (e.g., the minimum fixed rate, 0, etc.). In another example, the first fixed rate 441 may be set to a value chosen by a user (e.g., a multiple of a rate associated with the portfolio, an available market rate, etc.) and the second rate 461 may be set to a value less than the first fixed rate, such as the minimum fixed rate 450 or another suitable value.

At 520, the weighted average rate 423 and the total weighted notional amount 427 may be calculated by the computing device 344. In some cases, the total weighted notional amount 427 may be used when determining the notional amounts associated with the first remnant swap (e.g., the calculated notional amount 442).

At 530, the computing device 344 may create the first calculated swap using the first fixed rate 441 and the newly calculated notional amount 442. In some cases, the computing device 344 may calculate a difference between the sum 426 of the portfolio notionals and the notional amount 442 of the first calculated swap. This difference may be used as a notional amount 462 of the second calculated swap.

At 540, the computing device may create the second calculated swap using the second fixed coupon rate 461 and the notional amount 462. The cash flows associated with the first remnant swap and the cash flows associated with the second remnant swap may fully account for the cash flows of the swaps in the original portfolio. When the second fixed rate is chosen to be 0, the cash flows associated with the first remnant swap 436 fully account for the cash flows 435 of the fixed leg of the original portfolio. As such, the second fixed rate 461 may be set to 0 or another value less than the first fixed rate 441. As can be seen, the line items of the plurality of swaps 410 of the portfolio may be compressed into two calculated swaps, where all other economic details of the calculated swaps will match the trades in the original portfolio.

The second fixed coupon rate may be different than the first fixed coupon rate. For example, the second rate may be less than the first rate. In an illustrative example, the first fixed rate may be determined to be the maximum fixed rate 455 associated with the swaps 410 to be compressed and the second fixed rate may be determined to be a rate less than the maximum fixed rate 455. In some cases, the second fixed rate may be set to zero, the minimum fixed rate 450 associated with the swaps, an average value of the fixed rates associated with the swaps, or another value less than the first fixed rate. When a rate available in the market is used, such as the maximum rate 455, the minimum rate 450, and the like, no need may exist for rounding the fixed rate value. In some cases, a rate may be selected for use as either the first fixed rate or the second fixed rate such as by using a mathematical equation (e.g., multiplying a rate associated with the portfolio by a multiplier, determining an average value, etc.), determining a desirable rate currently available in the market, or selecting a particular value. In other cases, the rate of the first remnant swap and/or the second remnant swap may be determined by determining a rate corresponding to a currently quoted swap having matching economics to the plurality of swaps and/or receiving a user entered rate.

In some cases, the computing device 344 may compute a weighted notional value 425 for each of the plurality of swaps 410 by multiplying the notional amount and the rate associated with the individual swaps. The computing device 344 may then determine the sum 427 of the weighted notional values 425. When the second fixed rate is non-zero, the computing device 344 may determine the notional value associated with the first remnant swap using equation (3), as discussed below. When the second fixed rate is desired to be 0, the computing device 344 may determine the notional value associated with the first remnant swap using the first fixed rate and the sum 427 of weighted notionals, such that a coupon payments of the first remnant swap may be equal to the sum of the fixed cash flows associated with the plurality of swaps.

In some cases, determining the second remnant swap may comprise determining a second swap having a notional value set to the difference between the sum of notional values of the plurality of swaps 410 and the notional value 442 of the first remnant swap. In some cases, the second remnant swap may be determined using the second fixed rate, where the second fixed rate is greater than or equal to zero and less than the first fixed rate of the first remnant swap.

The computing device 344 may be configured to obtain the plurality of swaps from a data repository of a financial institution, either automatically or in response to a compression request. In some cases, the plurality of swaps may be compressed to reduce a number of line items, reduce a gross notional amount associated with the plurality of swaps, or both. For example, thresholds may be established to define when a portfolio may be compressed, such as a line item threshold (e.g., a maximum number of swaps to be held in a portfolio before compression; the number of line items after compression is less than the number of line items before compression, etc.) and/or a gross notional threshold (e.g. a maximum gross notional amount to be associated with the portfolio before compression; the gross notional amount after compression is smaller than the gross notional before compression, etc.). In an illustrative example, the computing device 344 may process instructions to determine when to compress a portfolio. For example, the computing device 344 may compare a count of the plurality of swaps included in a portfolio to a criterion, where the criterion may be that the number of line items after compression is smaller than the line items before compression. Responsive to the count meeting the criterion, the computer device 344 may blend at least a portion of the plurality of swaps using the first remnant swap and the second remnant swap, where the first remnant swap uses a first fixed rate and the second remnant swap uses a second fixed coupon rate less than the first fixed coupon rate. In some cases, the computing device 344 may compute a single compression swap, where the plurality of swaps is compressed into the single compression swap.

In some cases, the method 500 may include determining a total notional amount associated with a plurality of swaps having same economics, comparing the total notional amount to a criterion, and, responsive to the total notional amount meeting the criterion, blending at least a portion of the plurality of swaps 410 using the first remnant swap and the second remnant swap. In some cases, the criterion may correspond to a threshold associated with the gross notional of the plurality of swaps. For example, the computing device 344 may compare the gross notional amount to the criterion (e.g., a maximum gross notional amount; the gross notional amount after compression is smaller than the gross notional before compression, etc.). If the gross notional of the portfolio meets the criterion, then the computing device 344 may compress the portfolio. In some cases, in response to the criterion being met, the computing device 344 may send a notification that compression may be desirable. In some cases, two or more individual swaps included in the plurality of swaps may be selected by a user for compression.

In some cases, the computing device 344 may blend at least a portion of the plurality of swaps 410 using the first remnant swap and the second remnant swap on a daily basis and communicate, via the network 305, information about the first remnant swap and the second remnant swap to a financial institution associated with the plurality of swaps 410. The computing device 344 may further communicate, via the network 305, information about at least the blended portion of the plurality of the swaps to the financial institution, wherein at least the information about the first remnant swap and the second remnant swap may be used to meet a regulatory requirement, such as a BASEL 3 requirement.

DEFINITIONS $N_i$: The notional of the ith swap in an original portfolio.
$r_i$: The coupon of the ith swap in the original portfolio.
$r^{Max}$: The max coupon of swaps in the original portfolio.
$N^{(a)}$: The notional of the first calculated swap for matching fixed cash flows associated with the original portfolio.
$N^{(b)}$: The notional of the second calculated swap for matching fixed cash flows associated with the original portfolio.
$R^{(a)}$: The coupon of the first calculated swap for matching fixed cash flows associated with the original portfolio.
$R^{(b)}$: The coupon of the second calculated swap for matching fixed cash flows associated with the original portfolio.
$R^L$: The lower boundary for the range of swap coupons.
$R^U$: The upper boundary for the range of swap coupons.

Cash Flow Matching Conditions

When compressing a plurality of swaps included in a portfolio, the cash flow associated with the one or more swaps calculated during the compression process should match the total cash flow of the original portfolio. For example, to ensure that the floating cash flows match, the sum of the notionals associated with the first calculated swap and the second calculated swap may be set equal to the sum of the notional values of the plurality of swaps to be compressed.

$$N^{(a)} + N^{(b)} = \sum N_i \stackrel{\Delta}{=} A \qquad (1)$$

Similarly, to ensure that the fixed cash flows match, the sum of the weighted notionals associated with the first calculated swap and the second calculated swap may be set equal to the sum of the weighted notional values of the plurality of swaps to be compressed.

$$N^{(a)}R^{(a)} + N^{(b)}R^{(b)} = \sum (N_i r_i) \stackrel{\Delta}{=} B \qquad (2)$$

Combining equations (1) and (2), we have $$N^{(a)} = \frac{B - AR^{(b)}}{R^{(a)} - R^{(b)}} \qquad (3)$$

Because $N^{(a)}$ ($R^{(a)}$) and $N^{(b)}$ ($R^{(b)}$) are symmetric, we let $R^{(a)} > R^{(b)}$ without loss of generality. Further, to prevent unreasonably large rates for the first and second calculated swaps, certain constraints are set, such as $R^L \leq R^{(a)}$, $R^{(b)} \leq R^U$. In some cases, $R^U$ may be set to a maximum coupon of the original portfolio ($r^{Max}$). In other cases, $R^U$ may be set to a different defined maximum value, a weighted average of coupons values, a user defined value, or the like. Similarly, $R^L$ may be set to zero, a defined fixed minimum coupon value, a weighted average coupon value, a user defined value, or the like. In an illustrative example, the rates for the calculated swaps may be defined as $R^{(a)} = r^{Max}$ and $R^{(b)} = 0$. In another illustrative example $R^{(a)}$ may be set to $R^U$ and $R^{(b)}$ may be set to a value less than $R^U$, such as $R^L$. In doing so, the first calculated swap and the second calculated swap may be determined using an objective function for minimizing the gross notional associated with the portfolio of swaps.

$$abs(N^{(a)}) + abs(N^{(b)}) = abs(N^{(a)}) + abs(A - N^{(a)}) \quad (4)$$

If A is positive, $$abs(N^{(a)}) + abs(A - N^{(a)}) = \begin{cases} N^{(a)} < 0 : A - 2N^{(a)} \\ 0 \leq N^{(a)} < A : A \\ N^{(a)} \geq A : 2N^{(a)} - A \end{cases} \quad (5)$$

Here, as the notional of the first swap, $N^{(a)}$, approaches the interval [0, A], the gross notional will be reduced.

Similarly, if A is negative, $$abs(N^{(a)}) + abs(A - N^{(a)}) = \begin{cases} N^{(a)} < 0 : A - 2N^{(a)} \\ A \leq N^{(a)} < 0 : -A \\ N^{(a)} \geq 0 : 2N^{(a)} - A \end{cases} \quad (6)$$

As before, as $N^{(a)}$ approaches the interval [A, 0], the gross notional will be reduced. Therefore, to minimize cash flows, it is desirable to minimize the absolute value of $N^{(a)}$, where $$N^{(a)} = \frac{B - AR^{(b)}}{R^{(a)} - R^{(b)}}.$$

This may be achieved by setting $R^{(a)}$ to be as large a value as desired, such as by setting $R^{(a)} = R^U$ (e.g., $r^{Max}$), and by setting $R^{(a)}$ to be as small a value as feasible, such as $R^{(b)} = R^L$ (e.g., 0). A detailed proof can be found below. However, other rates may be used as well. In other cases, $R^{(a)}$ may be set to a value other than $r^{Max}$, and $R^{(b)}$ may be a value greater than 0, but less than $R^{(a)}$. For example, $R^{(a)}$ may be set to a multiple of $r^{Max}$, or other value larger or smaller than $r^{Max}$, or some other user defined value. Similarly $R^{(b)}$ may be set to $r^{Min}$, or other value less than $R^{(a)}$.

Once the rates have been determined, the notional amounts N(a) and N(b) may be calculated, such as by using the equation:

$$N^{(a)} = \frac{B - AR^{(b)}}{R^{(a)} - R^{(b)}}, \text{ and } N^{(b)} = \sum N_i - N^{(a)}. \quad (7)$$

By defining the first calculated swap to have a notional N(a) and a fixed rate of R(a) and the second calculated swap to have a notional of N(b) and a fixed rate of R(b), the gross notional associated with these two swaps could be reduced from the gross notional amount associated with the original portfolio of swaps. Further, the fixed and the floating cash flows of the calculated swaps match the fixed and floating cash flows of the original portfolio.

Proof of $R^{(a)} = R^U$ and $R^{(b)} = R^L$

Recall that $$N^{(a)} = \frac{B - AR^{(b)}}{R^{(a)} - R^{(b)}} = \frac{B - AR^{(a)}}{R^{(a)} - R^{(b)}} + A$$

and that $R^{(a)} > R^{(b)}$, which also means that $R^{(a)} - R^{(b)} > 0$. Further, the constraints are defined as: $R^L \leq R^{(a)}$, $R^{(b)} \leq R^U$. Because we want to minimize the absolute value of $N^{(a)}$, $|N^{(a)}|$, $R^{(a)}$ is desired to be as large as possible, or in other words, $R^{(a)} = R^U$.

To show why $R^{(b)} = R^L$ is desirable, consider a case when B>0 and A>0. In this case, when $B - AR^U > 0$, this indicates that for any $R \in [R^L, R^U]$, $B - AR > 0$. As such, in this case where $N^{(a)} > 0$, and $N^{(a)}$ is to be minimized by minimizing $R^{(b)}$, such as by setting $R^{(b)} = R^L$. For example, when $R^{(b)}$ decreases, $R^{(a)} - R^{(b)}$ increases. This, in turn, causes $$N^{(a)} = \frac{B - AR^{(a)}}{R^{(a)} - R^{(b)}} + A$$

to decrease.

When $B - AR^U < 0$, we desire to minimize $|N^{(a)}|$. When $R^{(a)} = R^U$, and $$N^{(a)} = \frac{B - AR^{(a)}}{R^{(a)} - R^{(b)}} + A < A.$$

The value of $N^{(a)}$ is desired to be maximized or, in other words, to be a value close to A. Therefore, we want $R^{(b)} = R^L$. For example, when $R^{(b)}$ decreases, $R^{(a)} - R^{(b)}$ increases and $$N^{(a)} = \frac{B - AR^{(a)}}{R^{(a)} - R^{(b)}} + A$$

increases. Note that in this case, as shown in FIG. 5A, when A>0, any $N^{(a)}$ that falls within interval [0, A] will minimize the objective function. Here, we choose $R^{(b)} = R^L$ such that $N^{(a)}$ is as large and as close to A as possible, which will minimize the objective function.

When B>0, A<0, for any $R \in [R^L, R^U]$, $B - AR > 0$, and thus $N^{(a)} > 0$. As such, $N^{(a)}$ may be maximized. Similar to discussion above, $R^{(a)} = R^U$ and $R^{(b)} = R^L$.

When B<0, A>0, this means that for any $R \in [R^L, R^U]$, $B - AR < 0$, thus $N^{(a)} < 0$, and $N^{(a)}$ may be maximized. Similar to discussion above, $R^{(a)} = R^U$ and $R^{(b)} = R^L$.

When B<0, A<0, the following cases exists. When $B - AR^U < 0$, this indicates that for any $R \in [R^L, R^U]$, $B - AR < 0$. In this case, $N^{(a)} < 0$, and $N^{(a)}$ may be maximized. Similar to discussion above, $R^{(a)} = R^U$ and $R^{(b)} = R^L$.

When $B - AR^U > 0$, we want to minimize $|N^{(a)}|$. When $R^{(a)} = R^U$, $$N^{(a)} = \frac{B - AR^{(a)}}{R^{(a)} - R^{(b)}} + A > A.$$

Therefore, we want to minimize $N^{(a)}$ to be close to A. This is achieved by setting $R^{(b)}=R^L$. For example, when $R^{(b)}$ decreases, $R^{(a)}-R^{(b)}$ increases, and $$N^{(a)} = \frac{B - AR^{(a)}}{R^{(a)} - R^{(b)}} + A$$

decreases. In this case, when A<0, any $N^{(a)}$ that falls within interval [A, 0] will minimize the objective function. In some cases, we may choose $R^{(b)}=R^L$ such that $N^{(a)}$ is as small and as close to A as possible. In doing so, the objective function is minimized.

It may be illustrated that over a range of $R^{(b)}$ near 0, the notional of the first trade $N^{(a)}$ remains near a minimum value. Similarly, it may be illustrated that over a range of rates $R^{(b)}$ near zero, the gross notional of the compressed swaps remain near a minimum value. As such, by choosing a value of $R^{(b)}$ different than 0, the gross notional of the compressed swaps may still remain within a range close to a minimum value. In some cases, a portfolio owner may desire to compress a portfolio of multiple swaps into a single swap to represent the original portfolio. This may be accomplished in a number of ways. In a first illustrative example, the notional and coupon for the single blended swap may be defined as N* and R*, respectively. To ensure that the fixed cash flow and the floating cash flow match the corresponding cash flows of the original portfolio, the notional, N*, and coupon, R*, may be determined using:

$$N^* = \sum N_i = A \qquad (8)$$

and, $$R^* = \frac{\sum (N_i r_i)}{N^*} = \frac{B}{A} \qquad (9)$$

To match the cash flow of the compressed swap to the cash flow of the original portfolio, the precision of the rate R* may be determined in such a way that the cash flows match. In some cases, the rate R* may be rounded to a precision similar to a precision available in a financial market (e.g., up to 5 decimal places, up to 7 decimal places, etc.). In some cases, the precision of the rate R* may necessarily be greater than is available in a market, to ensure that the cash flows match. For example, when matching the cash flows, a greater precision may be required (e.g., at least 7 decimal places). Rounding of the rate may or may not be required and may be specified by an institution associated with the original portfolio.

Because the notional value of each swap included in the original portfolio may be positive or negative. As such, some caveats may exist for this approach when both payer and receiver swaps are included in the original portfolio to be compressed. For example, when the net notional of the original portfolio is zero (e.g., A=0), the calculation cannot be performed. In another case, when the net notional of the original portfolio is close to zero, the coupon value of the compressed swap may become large. In some cases, this large coupon value may not be desirable.

In some cases, instead of using $$R^* = \frac{\sum (N_i r_i)}{N^*} = \frac{B}{A},$$

the rate of the blended swap may be set to some coupon number R close to R*. In such cases, additional frequent payments may be added to account the cash flow difference due to the difference between R and R*. In this case, the swap notional would still be net notional, i.e. $N^*=\Sigma N_i=A$. This scheme may result in a more complex cash flow management scheme.

Using a two swaps approach, we have $R^{(a)}=R^U$ and $R^{(b)}=R^L$. If $R^L$ is set to be 0, the second swap will become a swap with zero coupon. In such cases, these two swaps may be combined into a single swap having different notional on the fixed leg and the floating leg. In other words, the fixed leg notional may be $N^{fix}=N^{(a)}$, and the floating leg notional may be $N^{fl}=N^{(a)}+N^{(b)}$. While this combined swap may avoid any shortcomings of the previously discussed swaps, this swap may be considered a non-standard swap. In some cases, a portfolio owner may approve a non-standard swap, such as this on a case by case basis.

In some cases, to blend the coupons associated with the swaps of a particular portfolio, a single blended swap may be constructed having the same financials as the sum of the swaps in the portfolio. For example, a swap may be constructed having a notional equal to the sum of the notionals of the swaps. In this case, the rate of the single blended swap may be found by dividing the sum of the weighted notionals by the sum of the notionals of the swaps to be compressed.

Figure 6:
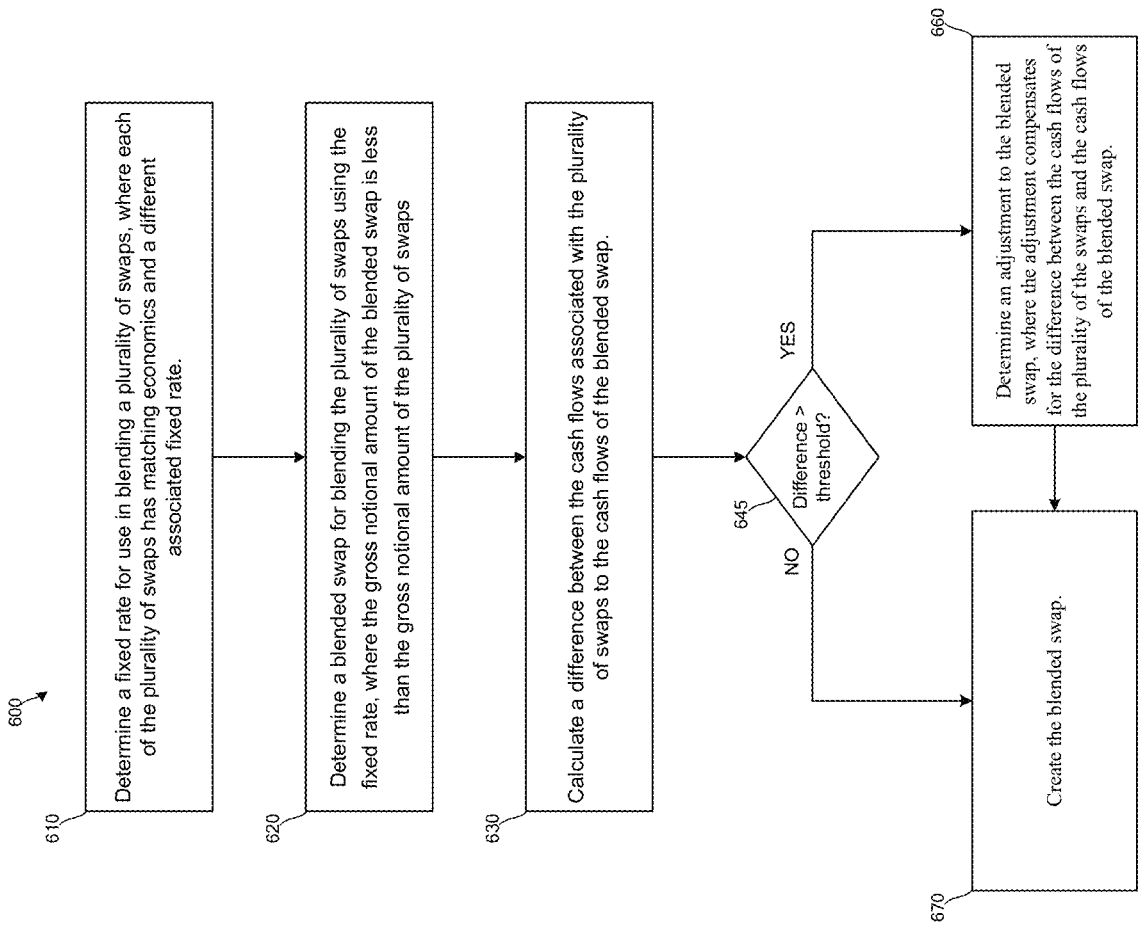
FIG. 6 depicts another illustrative flow diagram for blending coupons associated with a plurality of swaps, according to some embodiments.

FIG. 6 shows another illustrative flow diagram 600 for blending coupons associated with a plurality of swaps. For example, at step 610, a computing device (e.g., the computing device 344, the clearinghouse module 140, etc.) may determine a fixed rate for use in blending a plurality of swaps (e.g., the swaps 410), where each of the plurality of swaps 410 has matching economics and a different associated fixed rate. In some cases, the swaps include both pay swaps and receive swaps. At step 620, the computing device 344 may determine a blended swap for blending the plurality of swaps 410 using the fixed rate. At 630, the computing device may determine a difference between the cash flows of the plurality of swaps and cash flows associated with the blended swap. For example, in some cases, a selected precision (e.g., 2 decimal places, 5 decimal places, up to 7 decimal places, etc.) of the fixed rate may not allow the cash flows to be completely matched. The cash flow difference is then compared to a threshold at 645. In some cases, the threshold may be a value associated with an acceptable difference in cash flows and the single blended swap may be created at 670. For example, the threshold may be a value less than a specified amount (e.g., about 100 dollars, about 1 dollar, about 1 cent, etc.). If the difference is more than the threshold, then at 660, an adjustment may be made to the blended swap that is created at 620. However, if the difference is less than a threshold, no correction may be performed.

In some cases, a compensation amount (e.g., a cash amount) may be associated with the blended swap, where the compensation amount corresponds to the difference between the cash flows of the original portfolio and the cash flow of the blended swap. In another example, the precision of the fixed rate may be extended (e.g., increased from 5 decimal places to 6 or more decimal places) until the difference has been reduced below the threshold. In another cases, compensation may include adding a precise spread over the single swap trade. In some cases, different notional amounts may be applied to each leg of the single swap such that the difference is reduced below the threshold. In another example, a two swap solution may be substituted for the single swap solution.

Figure 12:
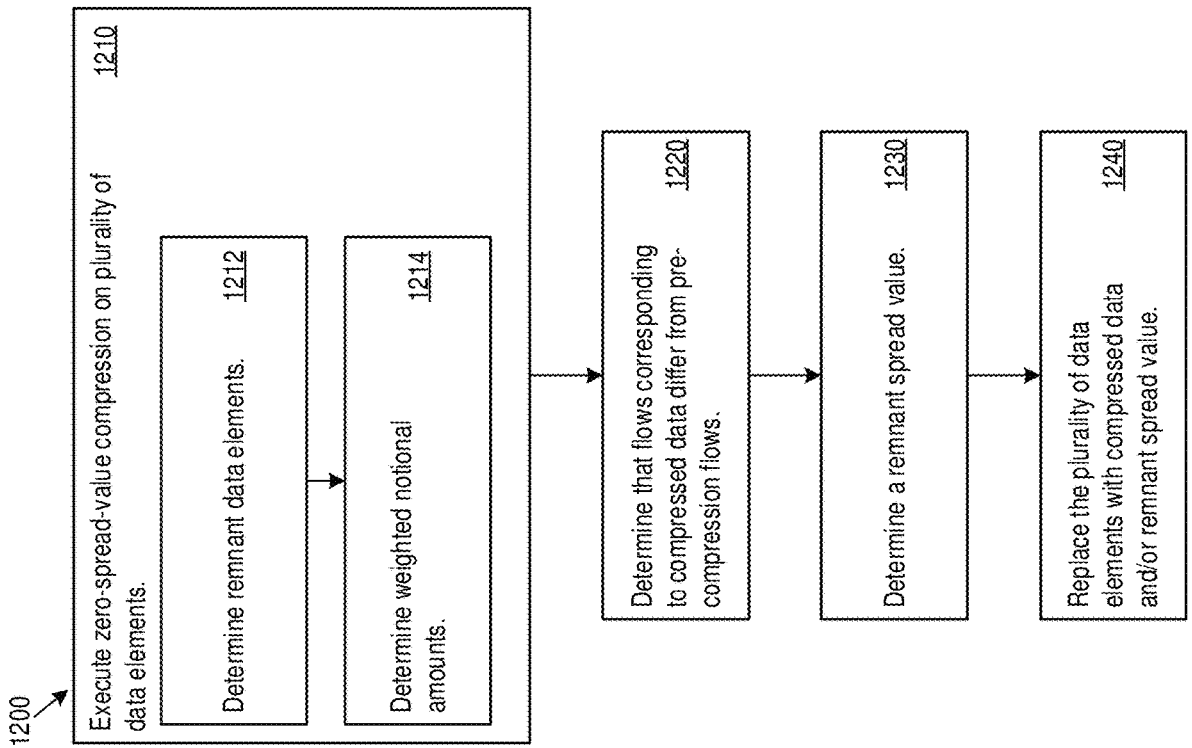
FIG. 12 depicts another illustrative flow diagram for the compression of data elements associated with a plurality of swaps, according to some embodiments.

FIG. 12 shows yet another illustrative flow diagram 1200 for the compression of data elements associated with a plurality of swaps. For example, at 1210 a computing device may execute a zero-value-spread compression scheme for a plurality of data elements corresponding to one or more electronic transactions. The plurality data elements may include various parameters characterizing the one or more electronic transactions. For example, the plurality data elements may detail fixed rates, notional amounts, spread values, and/or other values characterizing the electronic transactions.

At 1212, executing the zero-value-spread compression scheme may include determining a remnant data elements. For example, using maximum and/or minimum fixed rates from among the plurality data elements, the computing device may determine adjusted maximum and/or minimum fixed rates corresponding to a zero-spread value and assign these rates to respective remnant elements. At 1214, the adjusted maximum and/or minimum fixed rates may be used to determine corresponding weighted notional amounts that may similarly be assigned to respective remnant elements.

At 1220 and after executing the zero-value-spread compression scheme, the computing device may determine that one or more flows, such as cash flows, differ from the corresponding pre-compression flows. For example, a ratio between fixed and float cash flows may have changed as a result of the zero-value-spread compression scheme. In some cases, any difference in flows may trigger compensation. In some cases, one or more thresholds may be applied to avoid use of computing cycles to correct for below threshold flow differences. At 1230, to correct for the determined difference, the computing device may determine a remnant spread value based on one or more of the weighted notional amounts, a period for execution of the transaction, and/or a difference of pre-compression and remnant flows. The remnant spread value may then be applied to the weighted notional of the corresponding remnant data element to correct for the compression effect on the flows.

At 1240, the computed remnant data elements and remnant spread values may replace the original plurality of data elements to reduce the data stored for the corresponding electronic transactions.

Systems and methods are described for reducing memory storage and communication bandwidth requirements by compressing data based on the underlying stored information. A memory management computing device may be programmed to monitor a size of a plurality of data structures stored in a data repository, i.e., the data structures which store data indicative of the IRS positions held in each trader's portfolio. The computing device may compare the size of each of a plurality of data structures to a predetermined threshold. When a size of an uncompressed data structure meets the threshold, the memory management computing device may implement the compression processes disclosed herein, e.g., calculate a value of a first compression parameter based on a value of a first parameter and a value of a second parameter of each data element of the uncompressed data structure, calculate a value of a second compression parameter based the value of the first parameter of each data element of the uncompressed data structure, and generate a compressed data structure based on the value of the first compression parameter and the second compression parameter. The memory management computing device may replace, in the data repository, the uncompressed data structure with the compressed data structure.

In some implementations, the data size threshold may be determined based on one or more reference data sizes. For example, an average data size (mean size, median size, or other statistically representative size) for a group of data elements associated with a single swap transaction may be calculated. The average data size may be specific to the type of swap transaction being collected in the data repository and/or specific to the type of swap being compared to the threshold. For example, a threshold for a swap of a first type may be based on an average data size that is representative of swaps of the first type, but that same average data size may not necessarily be representative of swaps of other types. In some cases, the threshold may be based on a maximum data size for a single swap. The maximum data size may be based on empirical data, e.g., by recording the largest data size encountered in a population of swaps and/or based on theoretical data, e.g., by assuming maximum occupancy of any data fields within the data elements characterizing a swap. In an example, the reference data size may be used to trigger compression when a specific number of swaps have accumulated in the data repository.

In an example, a reference data size may include a data size for a specific data field. For example, in some cases, individual swaps may be characterized by a single fixed rate, a single spread, or other single value of a given type. Accordingly, the reference data size may be based on the data size of a specific value type within the data elements. The threshold comparison may be specific to the data storing that value type. In some cases, a reference data size that is specific to a particular value type may allow for reduced variance in data size from swap to swap. Thus, usage of a reference data size specific to a data field type may be used to more accurately measure the number of swaps that have accumulated in the data repository.

In some cases, the threshold may be based on other factors such as the fullness of the data repository itself, the maximum data reserved in the data repository for swaps of the type being compared to threshold, and/or other storage capacity constraints.

In an illustrative example, a data repository associated with a financial institution may store thousands of data structures, e.g., each indicative of a trader's portfolio, each having up to ten thousand data elements, e.g., each indicative of a position held in an IRS instrument, where each data structure stores electronic information associated with a different portfolio and each line item of a particular data structure may correspond to an electronic transaction associated with the portfolio. In some cases, the financial institution may be required to store a record of each electronic transaction to meet one or more regulatory requirements. As such, as the number of electronic transactions increases, particularly for institutional trading firms, the number of records to be stored may exceed an allowable memory allocation size in a relatively short time. In some cases, the electronic data structures corresponding to electronic portfolios may be synchronized over a network between two or more computing systems one or more times a day. In some cases, synchronization may be performed on a real-time (or near real-time) basis. In such cases, synchronizing thousands of portfolios, each including thousands of transactions, may cause communication traffic to slow, particularly during periods of high communication traffic. By actively monitoring a size of each portfolio data structure, memory usage may be proactively managed to minimize memory usage requirements and limit manpower and equipment costs in installing, testing, and activating additional storage devices. Similarly, communications delays may be minimized through actively managing the size of the data structures communicated and/or synchronized between different computing systems. Through active management of data structure size, communication times and/or delays may be minimized proportionally.

In some cases, the remote computing system 340 may monitor a size of each of the plurality of data structures 322, where the size of the data structure may correspond to the number of data elements of each data structure (e.g., the number of data elements of data structure 322). In some cases, the remote computing system may compare the size of each data structure 322 to a pre-defined threshold. In some cases, the size of each data structure may be compared to the same threshold or each data structure may be assigned a different threshold based on characteristics of a user, business organization, or data stored in the data structure. For example, the threshold may be 100 data elements, 1,000 data elements, 10,000 data elements or the like. In many cases, the remote computing system may be used to manage memory requirements for a large number of data structures stored on one or more different computing devices.

As was noted, spread is essentially an adjustment or compensating factor, such as to compensate for added risk, added to adjust the payments made for one of the legs, e.g., the floating leg, e.g., to set a minimum/additional payment amount or floor, etc. The spread may be specified in terms of the other leg, e.g., fixed rate+0.25%.

Further, as was noted above, spread was not a commonly used parameter in IRS contracts, particularly vanilla fixed/floating swaps (not cross currency or basis swaps). While IRS positions having a spread component may be netted/offset when the spread component, along with the other requisite parameters are identical, those IRS positions were ignored by existing compression systems when implementing blending as they add another variation between the IRS positions to be compressed on top of the variation in fixed rate. As spread was not commonly used, not blending these positions did not significantly impact the performance of the compression systems.

However, with the upcoming retirement of the LIBOR interest rate, there is a need to modify existing IRS positions which currently reference LIBOR to reference a different floating rate, referred to as a "risk free rate" (RFR), such as the Fed Funds effective rate. As the chosen RFR and LIBOR are necessarily different rates, one cannot simply be swapped for another in a given existing IRS position while maintaining the same economic characteristics of that IRS position. Accordingly, in addition to changing the reference interest rate, a compensating factor, in the form of a spread, will be added to the converted position to account for the difference in the rates. This spread will be determined by the market or a regulatory agency.

Where all trade/positions economics, including the spread, are identical, netting/offsetting may still be used to compress positions.

However, given the volume of existing IRS positions which reference LIBOR, once converted to reference the RFR, there will be a considerable volume of IRS positions now including a spread component which may vary between positions, in addition to variances in the fixed rates. Accordingly, to manage the consumption of computational resources, including data storage, the disclosed embodiments implement a unilateral blending operation which, without altering a risk profile (risk free), accounts for the spread component thereby enabling the compression of a wider variety of positions and, thereby, an improved reduction in data size. In particular, the disclosed embodiments, which may be a modification of blending system described above with respect to FIGS. 2-6, may be applied to the unilateral compression, using blending, of centrally cleared IRS positions by a clearing house:

That have different fixed rates, and no spread/adjustment to those fixed rates (as is currently performed);

That have different fixed rates, and the same spread/adjustment to those fixed rates;

That have identical fixed rates but each may have a different spread/adjustment thereto; or That have different fixed rates but each may have a different spread/adjustment thereto.

In one embodiment, the disclosed compression process is performed periodically, e.g., daily after close of the trading session, in accordance with trader defined configuration parameters set by the trader for each portfolio which specify, for the portfolio or particular positions therein, whether or not compression is to be applied and the degree to which it is to be applied. For example, the configuration settings may specify:

No compression: keep the account gross wherein all line items are maintained;

Netting/offsetting only: complementary positions, where most of the economic parameters match, are negated; or Coupon blending: positions having fewer matching parameters are replaced by a lesser number of replacement positions which match, in aggregate, the economic characteristics of the replaced positions.

As was described above, unilateral compression may be used to reduce both outstanding gross notional and position line items (and the data indicative thereof) without altering cash flows and without dependence on the position's counterparty, and may be applied daily as part of existing workflows or selectively as part of an ad hoc process.

Further, as was described, coupon blending, or just blending, is a form of compression that reduces notional amounts and line items, and associated data, for trades/positions with varying fixed rates, varying notional amounts and varying direction but otherwise contain matching attributes. The net cash flows of the resulting compressed positions, i.e., the generated replacement positions which will replace the compressed positions, will remain the same as the original portfolio.

An example existing coupon blending process, such as the process implemented by the Chicago Mercantile Exchange Inc., is as follows:

Select trades/positions to be included in the process, e.g., via the blending identifier found on the trade register or the entire portfolio;

Identify the highest and lowest fixed rates among the selected trades/positions to be compressed;

Solve for the notional of Remnant 1 (R1) and Remnant 2 (R2) such that the cash flows match those of the selected trades/positions of the original portfolio;

Terminate the original selected trades/positions, and remove the data associated therewith, which have been replaced by R1 and R2; and Initiate the trades/positions R1 and R2 into the portfolio.

As the interest rates industry is transitioning from Interbank Lending Rate ("IBOR"), such as LIBOR, to a Risk Free Rate ("RFR"), such as the Fed Funds effective rate, market is more likely to have spread added to the newly created RFR swap (Overnight Indexed Swap (OIS)) after being converted from LIBOR swaps.

As described above, the disclosed embodiments enhance/improve the current logic/scope of product coverage, e.g., the system described above with respect to FIGS. 2-6, under unilateral compression (Netting/Blending) to support coupon blending of Fix-Float swaps having varying fixed rates and varying spreads. The enhanced/improved logic of the disclosed embodiments will allow trades to become eligible for blending when group has,
varying fixed rate and no spread
same fixed rate and varying spread
varying fixed rate and same spread
varying fixed rate and varying spread
(Considering all other trade economics/attributes in a compression group match as per eligibility criteria)

FIG. 7 shows a sample set of IRS positions to compress and may be representative of a single portfolio of select subset thereof, e.g., defined by the trader or otherwise determined to be eligible for this blending process. Accordingly, FIG. 7 depicts the selected set of positions to be compressed as described herein. Each position may be represented by data stored in a data structure or otherwise in a memory, the data consuming an amount of the memory. In this example, there are 10 swap positions which will be compressed. As shown in FIG. 7 for step 1 of the disclosed process, a new/adjusted fixed rate is calculated for each position by removing the spread equivalent amount on both the legs such that spread is reduced to 0. The adjusted Fixed Rate is shown as Fixed Rate* and the adjusted Spread is shown as Spread* and will be zero. Generally, for this process, the spread is being combined into the fixed component.

As shown in FIG. 8 for step 2 of the disclosed process, the net weighted notional amount is calculated for each position based on the adjusted fixed rate, wherein:
Weighted notional is the product of the fixed rate* and notional amount.
Net weighted notional is the sum of the weighted notional amount for all of the swaps in the selected set of positions to be compressed.

FIG. 8 further shows the maximum and minimum adjusted fixed rates (shown in bold in the table).

For step 3 of the disclosed process, the notional of the first Remnant Trade (T1), of the two Remnant Trades to be generated, is derived so as to minimize the gross notional of all of the swaps to be compressed, wherein:
Highest fixed rate among the blended trades is fixed rate on Remnant Trade 1 (T1)
Lowest fixed rate among the blended trades is fixed rate on Remnant Trade 2 (T2)
Given the two fixed rates, we calculate notional for T1 (rounded to two decimal places)

$$T1\text{Notional} = \frac{(\text{Net Weighted Notional} - \text{Net Notional} \times \text{Lowest Fixed Rate})}{(\text{Highest Fixed Rate} - \text{Lowest Fixed Rate})}$$

$$T1\text{ Notional} = \frac{(581,179,490 - 332,000,000 \times 1.8682)}{(2.6478 - 1.8682)} = -50,106,349.41$$

For step 4 of the disclosed process, the second Remnant Trade (T2) is created so that the cash flows of the fixed and floating legs match those of the original selected positions to be compressed, wherein:
Notional amount on Remnant Trade 2 is calculated as follows:
T2 Notional=Net Notional-T1 notional
T2 Notional=332,000,000-(-50,106,349.41)=382,106,349.41

The two remnant Trades, T1 and T2, will have the same economic characteristics as the selected IRS positions being compressed (shown in FIG. 7) and will eventually replace those positions and the data indicative thereof.

FIG. 9 depicts the original compression group, i.e., the original selected positions for compression shown in FIG. 7, and shows the economic characteristics, cash flows, etc. to demonstrate that they will be replicated by the newly created remnant trades T1 and T2.

FIG. 10 depicts the blending result. Note that at this stage, total cashflow of the two remnant trades T1 and T2 will match the total cashflow of the original selected positions for compression shown in FIG. 7. However, the leg level cashflows do not match. Further, in order to align leg level (fixed and float) cashflows of remnant trades T1 and T2 to the original cashflows, one of the remnant trades will have a calculated spread and the fixed rate adjusted by the equivalent spread value.

In particular, FIG. 11 depicts the remnant spread calculation. The remnant spread value is calculated based on the difference in the amount between sum the of cashflow of the original group of positions selected for compression shown in FIG. 7 and the resulting remnant trades T1 and T2.

Remnant Spread Rate: (Leg Cashflow Difference/Period/Notional)*100 T2 Spread=(13,633.96/0.504109589/382,106,349.41)*100=0.00707757

The calculated remnant spread is added to the second remnant trade T2 with the fixed rate adjusted by equivalent spread value. The sum of two remnant trades' T1 and T2 leg level cashflow now match the sum of original positions to be compressed' leg level cashflow. The final remnant positions/swaps T1 and T2 are shown in FIG. 11.

The original positions to be compressed may now be terminated and the data indicative thereof removed from the memory. The new remnant positions T1 and T2 are then initiated/created and the data indicative thereof stored in the memory. As the data indicative of these two positions is necessarily less than the data indicative of the ten original positions, the overall data size of the portfolio has been reduced while the economics thereof have been maintained, as described.

EXCHANGE COMPUTING SYSTEM/TRADING ENVIRONMENT

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principals involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
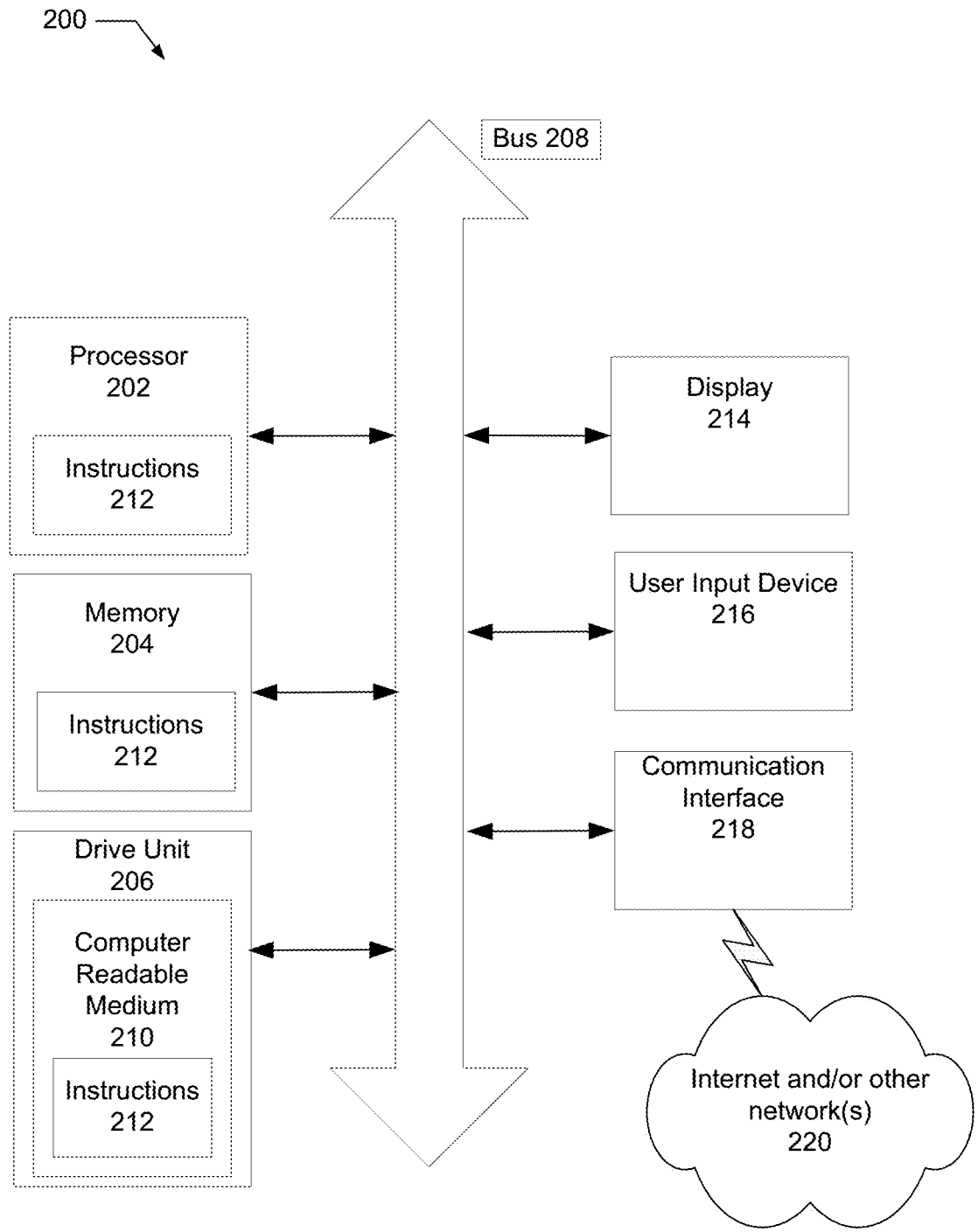
FIG. 2 depicts a general computer system, according to some embodiments.

The exchange computer system 100 may be implemented with one or more mainframe, desktop or other computers, such as the example computer 200 described herein with respect to FIG. 2.

A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included as part of the clearing systems 124 which provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100 and comprised by the clearing systems 124. For example, the settlement module 120 and the risk management module 114 may be integrated to any desired extent. In some cases, one or more margining procedures or other aspects of the margining mechanism(s) may be implemented by the clearing systems 124, such as the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120 or clearing systems 124, compression module 122 or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based compute device, or other wireless device, may communicate with the LAN 160 and/or the Internet 162 via radio waves, such as via WiFi, Bluetooth and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As described, the disclosed embodiments relate to a system/apparatus for reducing a data size of a database/data structure stored in a memory of a data transaction processing system 100, which stores a plurality of data records, each of the plurality of data records being characterized by a record data size and storing data indicative of a position (of one or more portfolios) in one or more financial instruments, such as interest rate swaps, futures contracts, etc. The system/apparatus may be referred to as an architecture which enables post-trade processing of portfolio/position databases/data structures, or subsets thereof, to reduce the data size thereof for storage, communication and/or processing and may further reduce other aspects or characteristics such as gross notional value, total risk, etc. More particularly, the disclosed embodiments implement a compression module 122 which, as described above, may be a part of the exchange computer system 100 or an adjunct service provided thereto, and which processes a select subset of data records to effect an optimized reduction thereof as described.

It will be appreciated that the disclosed system/apparatus may be implemented by the exchange computer system 100 and include compression module 122, describe above with respect to FIG. 1, which may be a separate module or a part (as a distinct module or the functionality therefor) of the Clearing House Systems 124, Settlement Module 120, or other module of the exchange computing system 100 described above and shown in FIG. 1. The system includes a processor, and a non-transitory memory coupled therewith, such as the processor 202, memory 204, described in detail above with reference to FIG. 2. A user interface (not shown) may be provided for the purpose of receiving one or more of the parameters or constraints described herein from a user, such as one or more of traders/market participants whose position are undergoing the disclosed reduction process, or from an administrator of the exchange computer system 100.

Various implementations have been described. Other implementations are possible. Table 1 includes various examples.

TABLE 1

Examples

1. A system comprising:
    a processor; and
    a non-transitory memory device storing instructions that when executed by the processor cause the processor to:
        monitor an amount of data stored in a memory coupled with the processor and corresponding to a plurality of data elements, wherein each data element includes first and second parameters associated with a corresponding electronic transaction, where the first parameter comprises a fixed rate and the second parameter comprises a spread value;
        determine that the amount of data exceeds a threshold and based thereon:
            select at least a subset of the plurality of data elements;
            calculate an adjusted first parameter as a function of the second parameter for each of the selected subset of the plurality of data elements, and identify a maximum adjusted first parameter and minimum adjusted first parameter;
            calculate a net weighted notional amount for each of the selected subset of the plurality of data elements based on the associated adjusted first parameter;
            generate first and second remnant data elements TABLE 1-continued Examples and assign the maximum adjusted first parameter to the first remnant data element and the minimum adjusted first parameter to the second remnant data element;
    compute the notional value of the first remnant data element based on the maximum adjusted first parameter and the minimum adjusted first parameter;
    compute the notional value of the second remnant data element as a difference of the net weighted notional and the first remnant data element;
    compute a remnant spread value for the second remnant data element based on a pre-compression flow amount for a period of the corresponding electronic transaction and a remnant flow amount for the period; and
    replace, in the memory, the plurality of data elements with the first and second remnant data elements, where: optionally, the system is in accord with any other example in this table.
2. The system of example 1 or any other example in this table, wherein the threshold is based on an average data occupancy of at least two electronic transactions of a type of the corresponding electronic transaction.
3. The system of example 1 or any other example in this table, wherein the remnant flow amount corresponds to a flow amount determined with a zero-value spread for the first and second remnant data elements.
4. The system of example 3 or any other example in this table, wherein the remnant spread value is based on a difference of the pre-compression flow amount and the remnant flow amount.
5. The system of example 4 or any other example in this table, wherein remnant spread value is based on the difference of the pre-compression flow amount and the remnant flow amount divided by the notional value of the second remnant data element.
6. The system of example 5 or any other example in this table, wherein the instructions are further configured to cause the processor to scale the notional value of the second remnant data element in accord with the period when determining the remnant spread value.
7. The system of example 6 or any other example in this table, wherein the instructions are further configured to cause the processor to convert the remnant spread value from a decimal value format to a percentage value format.
8. The system of example 1 or any other example in this table, wherein each of the plurality of data elements comprises data indicative of an interest rate swap characterized by a corresponding fixed rate, a corresponding floating rate a corresponding spread value.
9. The system of example 1 or any other example in this table, wherein the instructions are further configured to cause the processor to compute a remnant spread value for the second remnant data element to correct for loss from zero-spread-value compression applied to the plurality of data elements.
10. The system of example 9 or any other example in this table, wherein the loss from the zero-spread-value compression changes an apportionment between a fixed flow and a float flow for the plurality of data elements.
11. A computer-implemented data compression method including:
    monitoring, by a processor, an amount of data stored in a memory coupled with the processor and corresponding to a plurality of data elements, wherein each data element includes first and second parameters associated with a corresponding electronic transaction, where the first parameter comprises a fixed rate and the second parameter comprises a spread value;
    determining, by the processor, that the amount of data exceeds a threshold and based thereon:
        selecting, by the processor, at least a subset of the plurality of data elements;
        calculating, by the processor, an adjusted first parameter as a function of the second parameter for each of the selected subset of the plurality of data elements, and identify a maximum adjusted first parameter and minimum adjusted first parameter;
        calculating, by the processor, a net weighted notional amount for each of the selected subset of the plurality of data elements based on the associated adjusted first parameter;
        generating, by the processor, first and second remnant data elements and assign the maximum adjusted first parameter to the first remnant data element and the minimum adjusted first parameter to the second remnant data element;
        computing, by the processor, the notional value of the first remnant data element based on the maximum adjusted first parameter and the minimum adjusted first parameter;

TABLE 1-continued

Examples computing, by the processor, the notional value of the second remnant data element as a difference of the net weighted notional and the first remnant data element;
    computing, by the processor, a remnant spread value for the second remnant data element based on a pre-compression flow amount for a period of the corresponding electronic transaction and a remnant flow amount for the period; and
    replacing, in the memory, the plurality of data elements with the first and second remnant data elements, where:
optionally, the method is in accord with any other example in this table.
12. The method of example 11 or any other example in this table, wherein the remnant flow amount corresponds to a flow amount determined with a zero-value spread for the first and second remnant data elements.
13. The method of example 12 or any other example in this table, wherein the remnant spread value is based on a difference of the pre-compression flow amount and the remnant flow amount.
14. The method of example 13 or any other example in this table, wherein the remnant spread value is based on the difference of the pre-compression flow amount and the remnant flow amount divided by the notional value of the second remnant data element.
15. The method of example 14, further including scaling the notional value of the second remnant data element in accord with the period when determining the remnant spread value.
16. The method of example 15 or any other example in this table, further including converting the remnant spread value from a decimal value format to a percentage value format.
17. The method of example 11 or any other example in this table, wherein each of the plurality of data elements comprises data indicative of an interest rate swap characterized by a corresponding fixed rate, a corresponding floating rate a corresponding spread value.
18. The method of example 11 or any other example in this table, wherein computing a remnant spread value for the second remnant data element includes correcting for loss from zero-spread-value compression applied to the plurality of data elements.
19. The method of example 18 or any other example in this table, wherein the loss from the zero-spread-value compression changes an apportionment between a fixed flow and a float flow for the plurality of data elements.
20. A data compression system including:
    means for monitoring an amount of data stored in a memory corresponding to a plurality of data elements, wherein each data element includes first and second parameters associated with a corresponding electronic transaction, where the first parameter comprises a fixed rate and the second parameter comprises a spread value;
    means for determining that the amount of data exceeds a threshold and based thereon:
        means for selecting at least a subset of the plurality of data elements;
        means for calculating an adjusted first parameter as a function of the second parameter for each of the selected subset of the plurality of data elements, and identify a maximum adjusted first parameter and minimum adjusted first parameter;
        means for calculating a net weighted notional amount for each of the selected subset of the plurality of data elements based on the associated adjusted first parameter;
        means for generating first and second remnant data elements and assign the maximum adjusted first parameter to the first remnant data element and the minimum adjusted first parameter to the second remnant data element;
        means for computing the notional value of the first remnant data element based on the maximum adjusted first parameter and the minimum adjusted first parameter;
        means for computing the notional value of the second remnant data element as a difference of the net weighted notional and the first remnant data element;
        means for computing a remnant spread value for the second remnant data element based on a pre-compression flow amount for a period of the corresponding electronic transaction and a remnant flow amount for the period; and
        means for replacing, in the memory, the plurality of data elements with the first and second remnant data elements, where: optionally, the system is in accord with any other example in this table.
21. A method including:
    executing a zero-value-spread compression scheme on a plurality of data elements corresponding to one or more electronic transactions by computing first and second remnant data elements, the plurality of data element stored in memory;
    determining that a remnant flow corresponding to the first and second remnant data elements differs from a pre-compression flow for the one or more electronic transactions;
    executing compression loss correction by computing a remnant spread value; and
    replacing plurality of data elements in the memory with the first and second remnant data elements and/or the remnant spread value to reduce the stored memory size for the one or more electronic transactions, where:
optionally, the method is in accord with any other example in this table.
22. A system including a processor and memory storing instructions configured to cause the processor to execute the method of any other example in this table.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the disclosed embodiments or of what may be claimed, but rather as descriptions of features specific to particular embodiments of the disclosed embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a processor; and
   a non-transitory memory device storing instructions that when executed by the processor cause the processor to:
      determine that an the amount of data, stored in a memory coupled with the processor, corresponding to a plurality of data items exceeds a threshold, wherein each of the plurality of data elements includes a fixed rate and a spread value associated with a corresponding electronic transaction, the threshold being based on an average data occupancy of at least two electronic transactions of a type of the corresponding electronic transaction;
      select at least a subset of the plurality of data elements;
      calculate an adjusted fixed rate as a function of the spread value for each of the selected subset of the plurality of data elements, and identify a maximum adjusted fixed rate and minimum adjusted fixed rate for the selected subset of the plurality of data elements; and
      generate first and second remnant data elements and assign the maximum adjusted fixed rate to the first remnant data element and the minimum adjusted fixed rate to the second remnant data element;
      compute, based on a flow amount associated with the selected subset of the plurality of data elements for a period of the corresponding electronic transaction and a remnant flow amount for the period, a remnant spread value for the second remnant data element to correct for loss resulting from the generation of the first and second remnant data elements based on the selected subset of the plurality of data elements; and
      replace, in the memory, the selected subset of the plurality of data elements with the first and second remnant data elements.

2. The system of claim 1, wherein the remnant flow amount corresponds to a flow amount determined with a zero-value spread for the first and second remnant data elements.

3. The system of claim 2, wherein the remnant spread value is based on a difference of the flow amount associated with the selected subset of the plurality of data elements and the remnant flow amount.

4. The system of claim 2, wherein the instructions are further configured to cause the processor to compute a notional value of the second remnant data element as a difference of a weighted notional and the first remnant data element, wherein remnant spread value is based on the difference of the flow amount associated with the selected subset of the plurality of data elements and the remnant flow amount divided by the notional value of the second remnant data element.

5. The system of claim 4, wherein the instructions are further configured to cause the processor to scale the notional value of the second remnant data element in accord with the period when determining the remnant spread value.

6. The system of claim 5, wherein the instructions are further configured to cause the processor to convert the remnant spread value from a decimal value format to a percentage value format.

7. The system of claim 1, wherein the instructions are further configured to cause the processor to automatically reduce, responsive to determining that the amount of data exceeds the threshold, the amount of data.

8. A computer-implemented data compression method including:
   determining, by a processor, that an the amount of data, stored in a memory coupled with the processor, corresponding to a plurality of data items exceeds a threshold, wherein each of the plurality of data elements includes a fixed rate and a spread value associated with a corresponding electronic transaction, the threshold being based on an average data occupancy of at least two electronic transactions of a type of the corresponding electronic transaction;
   selecting, by the processor, at least a subset of the plurality of data elements;
   calculating, by the processor, an adjusted fixed rate as a function of the spread value for each of the selected subset of the plurality of data elements, and identify a maximum adjusted fixed rate and minimum adjusted fixed rate for the selected subset of the plurality of data elements; and
   generating, by the processor, first and second remnant data elements and assign the maximum adjusted fixed rate to the first remnant data element and the minimum adjusted fixed rate to the second remnant data element;
   computing, by the processor and based on a flow amount associated with the selected subset of the plurality of data elements for a period of the corresponding electronic transaction and a remnant flow amount for the period, a remnant spread value for the second remnant data element to correct for loss resulting from the generation of the first and second remnant data elements based on the selected subset of the plurality of data elements; and replacing, by the processor and in the memory, the selected subset of the plurality of data elements with the first and second remnant data elements.

9. The method of claim 8, wherein the remnant flow amount corresponds to a flow amount determined with a zero-value spread for the first and second remnant data elements.

10. The method of claim 9, wherein the remnant spread value is based on a difference of the flow amount associated with the selected subset of the plurality of data elements and the remnant flow amount.

11. The method of claim 10, wherein the remnant spread value is based on the difference of the flow amount associated with the selected subset of the plurality of data elements and the remnant flow amount divided by a notional value of the second remnant data element.

12. The method of claim 11, further including scaling a notional value of the second remnant data element in accord with the period when determining the remnant spread value.

13. The method of claim 12, further including converting the remnant spread value from a decimal value format to a percentage value format.

14. The method of claim 8, wherein each of the plurality of data elements comprises data indicative of an interest rate swap characterized by a corresponding fixed rate, a corresponding floating rate a corresponding spread value.

15. A data compression system including:
means for determining that an the amount of data, stored in a memory, corresponding to a plurality of data items exceeds a threshold, wherein each of the plurality of data elements includes a fixed rate and a spread value associated with a corresponding electronic transaction, the threshold being based on an average data occupancy of at least two electronic transactions of a type of the corresponding electronic transaction;
means for selecting at least a subset of the plurality of data elements;
means for calculating an adjusted fixed rate as a function of the spread value for each of the selected subset of the plurality of data elements, and identify a maximum adjusted fixed rate and minimum adjusted fixed rate for the selected subset of the plurality of data elements; and
means for generating first and second remnant data elements and assign the maximum adjusted fixed rate to the first remnant data element and the minimum adjusted fixed rate to the second remnant data element;
means for computing, based on a flow amount associated with the selected subset of the plurality of data elements for a period of the corresponding electronic transaction and a remnant flow amount for the period, a remnant spread value for the second remnant data element to correct for loss resulting from the generation of the first and second remnant data elements based on the selected subset of the plurality of data elements; and
means for replacing, in the memory, the selected subset of the plurality of data elements with the first and second remnant data elements.

16. The data compression system of claim 15, wherein the remnant flow amount corresponds to a flow amount determined with a zero-value spread for the first and second remnant data elements.

17. The data compression system of claim 16, wherein the remnant spread value is based on a difference of the flow amount associated with the selected subset of the plurality of data elements and the remnant flow amount.

18. The data compression system of claim 17, wherein the remnant spread value is based on the difference of the flow amount associated with the selected subset of the plurality of data elements and the remnant flow amount divided by a notional value of the second remnant data element.

19. The data compression system of claim 15, wherein each of the plurality of data elements comprises data indicative of an interest rate swap characterized by a corresponding fixed rate, a corresponding floating rate a corresponding spread value.

20. The data compression system of claim 15, further including means for automatically reducing, responsive to determining that the amount of data exceeds the threshold, the amount of data.

\* \* \* \* \*